(12) United States Patent
Wold

(10) Patent No.: US 8,006,314 B2
(45) Date of Patent: *Aug. 23, 2011

(54) SYSTEM FOR IDENTIFYING CONTENT OF DIGITAL DATA

(75) Inventor: Erling Wold, San Francisco, CA (US)

(73) Assignee: Audible Magic Corporation, Los Gatos, CA (US)

( * ) Notice: Subject to any disclaimer, the term of this patent is extended or adjusted under 35 U.S.C. 154(b) by 1058 days.

This patent is subject to a terminal disclaimer.

(21) Appl. No.: 11/829,662

(22) Filed: Jul. 27, 2007

(65) Prior Publication Data

US 2009/0030651 A1  Jan. 29, 2009

(51) Int. Cl.
*G06F 7/04* (2006.01)
*H04L 9/00* (2006.01)
*H04L 9/32* (2006.01)

(52) U.S. Cl. ............... 726/32; 726/28; 726/29; 726/30; 726/31; 713/176; 713/177

(58) Field of Classification Search ............ 726/32
See application file for complete search history.

(56) References Cited

U.S. PATENT DOCUMENTS

| | | | |
|---|---|---|---|
| 3,919,479 A | 11/1975 | Moon et al. |
| 4,230,990 A | 10/1980 | Lert, Jr. et al. |
| 4,449,249 A | 5/1984 | Price |
| 4,450,531 A | 5/1984 | Kenyon |
| 4,454,594 A | 6/1984 | Hefron et al. |
| 4,677,455 A | 6/1987 | Okajima |
| 4,677,466 A | 6/1987 | Lert, Jr. et al. |
| 4,739,398 A | 4/1988 | Thomas et al. |
| 4,843,562 A | 6/1989 | Kenyon et al. |
| 4,918,730 A | 4/1990 | Schulze |
| 5,210,820 A | 5/1993 | Kenyon |
| 5,247,688 A | 9/1993 | Ishigami |
| 5,283,819 A | 2/1994 | Glick |
| 5,327,521 A | 7/1994 | Savic et al. |
| 5,437,050 A | 7/1995 | Lamb et al. |
| 5,442,645 A | 8/1995 | Ugon |
| 5,504,518 A | 4/1996 | Ellis |
| 5,581,658 A | 12/1996 | O'Hagan et al. |
| 5,588,119 A | 12/1996 | Vincent |
| 5,612,729 A | 3/1997 | Ellis et al. |

(Continued)

FOREIGN PATENT DOCUMENTS

EP   0349106 A1   1/1990

(Continued)

OTHER PUBLICATIONS

Baum, L., et al., "A Maximization Technique Occurring in the Statistical Analysis of Probabilstic Functions of Markov Chains," *The Annals of Mathematical Statisics*, vol. 41, No. 1, pp. 164-171, 1970.

(Continued)

*Primary Examiner* — Longbit Chai
(74) *Attorney, Agent, or Firm* — Lowenstein Sandler PC

(57) ABSTRACT

A system for identifying a work represented by digital data. This system detects events in data of the content of an unknown work and measures a metric between the events. The system then compares the detected events and metrics from an unknown work with the events and metrics of a known work. If the events and metrics match, the unknown work is identified as a copy of the known work.

45 Claims, 13 Drawing Sheets

U.S. PATENT DOCUMENTS

| | | | |
|---|---|---|---|
| 5,612,974 A | 3/1997 | Astrachan | |
| 5,613,004 A | 3/1997 | Cooperman et al. | |
| 5,638,443 A | 6/1997 | Stefik | |
| 5,692,213 A | 11/1997 | Goldberg et al. | |
| 5,701,452 A | 12/1997 | Siefert | |
| 5,710,916 A | 1/1998 | Barbara et al. | |
| 5,724,605 A | 3/1998 | Wissner | |
| 5,732,193 A | 3/1998 | Aberson | |
| 5,850,388 A | 12/1998 | Anderson et al. | |
| 5,881,182 A * | 3/1999 | Fiete et al. | 382/275 |
| 5,918,223 A * | 6/1999 | Blum et al. | 1/1 |
| 5,924,071 A | 7/1999 | Morgan et al. | |
| 5,930,369 A | 7/1999 | Cox et al. | |
| 5,943,422 A | 8/1999 | Van Wie et al. | |
| 5,949,885 A | 9/1999 | Leighton | |
| 5,959,659 A | 9/1999 | Dokic | |
| 5,983,176 A | 11/1999 | Hoffert et al. | |
| 6,006,183 A | 12/1999 | Lai et al. | |
| 6,006,256 A | 12/1999 | Zdepski et al. | |
| 6,011,758 A | 1/2000 | Dockes | |
| 6,026,439 A | 2/2000 | Chowdhury | |
| 6,044,402 A | 3/2000 | Jacobson | |
| 6,067,369 A | 5/2000 | Kamei | |
| 6,088,455 A | 7/2000 | Logan et al. | |
| 6,092,040 A | 7/2000 | Voran | |
| 6,096,961 A | 8/2000 | Bruti | |
| 6,118,450 A | 9/2000 | Proehl et al. | |
| 6,192,340 B1 | 2/2001 | Abecassis | |
| 6,195,693 B1 | 2/2001 | Berry | |
| 6,229,922 B1 | 5/2001 | Sasakawa et al. | |
| 6,243,615 B1 | 6/2001 | Neway | |
| 6,243,725 B1 | 6/2001 | Hempleman et al. | |
| 6,253,193 B1 | 6/2001 | Ginter | |
| 6,253,337 B1 | 6/2001 | Maloney et al. | |
| 6,279,010 B1 | 8/2001 | Anderson | |
| 6,279,124 B1 | 8/2001 | Brouwer et al. | |
| 6,285,596 B1 | 9/2001 | Miura et al. | |
| 6,330,593 B1 | 12/2001 | Roberts et al. | |
| 6,345,256 B1 | 2/2002 | Milsted et al. | |
| 6,374,260 B1 | 4/2002 | Hoffert et al. | |
| 6,385,596 B1 | 5/2002 | Wiser | |
| 6,418,421 B1 | 7/2002 | Hurtado et al. | |
| 6,422,061 B1 | 7/2002 | Sunshine | |
| 6,438,556 B1 | 8/2002 | Malik et al. | |
| 6,449,226 B1 | 9/2002 | Kumagai | |
| 6,452,874 B1 | 9/2002 | Otsuka et al. | |
| 6,453,252 B1 | 9/2002 | Laroche | |
| 6,460,050 B1 | 10/2002 | Pace et al. | |
| 6,463,508 B1 | 10/2002 | Wolf et al. | |
| 6,477,704 B1 | 11/2002 | Cremia | |
| 6,487,641 B1 | 11/2002 | Cusson et al. | |
| 6,490,279 B1 | 12/2002 | Chen et al. | |
| 6,496,802 B1 | 12/2002 | van Zoest et al. | |
| 6,526,411 B1 | 2/2003 | Ward | |
| 6,542,869 B1 | 4/2003 | Foote | |
| 6,550,001 B1 | 4/2003 | Corwin et al. | |
| 6,550,011 B1 | 4/2003 | Sims, III | |
| 6,552,254 B2 | 4/2003 | Hasegawa et al. | |
| 6,591,245 B1 | 7/2003 | Klug | |
| 6,609,093 B1 | 8/2003 | Gopinath et al. | |
| 6,609,105 B2 | 8/2003 | van Zoest et al. | |
| 6,628,737 B1 | 9/2003 | Timus | |
| 6,636,965 B1 | 10/2003 | Beyda | |
| 6,654,757 B1 | 11/2003 | Stern | |
| 6,732,180 B1 | 5/2004 | Hale | |
| 6,771,316 B1 | 8/2004 | Iggulden | |
| 6,771,885 B1 | 8/2004 | Agnihotri et al. | |
| 6,834,308 B1 | 12/2004 | Ikezoye | |
| 6,947,909 B1 | 9/2005 | Hoke, Jr. | |
| 6,968,337 B2 * | 11/2005 | Wold | 1/1 |
| 7,043,536 B1 | 5/2006 | Philyaw | |
| 7,047,241 B1 | 5/2006 | Erickson et al. | |
| 7,058,223 B2 | 6/2006 | Cox et al. | |
| 7,181,398 B2 | 2/2007 | Thong et al. | |
| 7,266,645 B2 | 9/2007 | Garg et al. | |
| 7,269,556 B2 | 9/2007 | Kiss et al. | |
| 7,281,272 B1 | 10/2007 | Rubin et al. | |
| 7,289,643 B2 | 10/2007 | Brunk et al. | |
| 7,349,552 B2 | 3/2008 | Levy et al. | |
| 7,363,278 B2 | 4/2008 | Schmelzer et al. | |
| 7,529,659 B2 | 5/2009 | Wold | |
| 7,562,012 B1 | 7/2009 | Wold | |
| 7,565,327 B2 | 7/2009 | Schmelzer | |
| 7,593,576 B2 | 9/2009 | Meyer et al. | |
| 2001/0013061 A1 | 8/2001 | DeMartin | |
| 2001/0027522 A1 | 10/2001 | Saito | |
| 2001/0034219 A1 | 10/2001 | Hewitt et al. | |
| 2001/0037304 A1 | 11/2001 | Paiz | |
| 2001/0056430 A1 | 12/2001 | Yankowki | |
| 2002/0049760 A1 | 4/2002 | Scott | |
| 2002/0064149 A1 | 5/2002 | Elliott et al. | |
| 2002/0082999 A1 | 6/2002 | Lee | |
| 2002/0087885 A1 | 7/2002 | Peled et al. | |
| 2002/0120577 A1 | 8/2002 | Hans et al. | |
| 2002/0123990 A1 | 9/2002 | Abe et al. | |
| 2002/0129140 A1 | 9/2002 | Peled et al. | |
| 2002/0133494 A1 | 9/2002 | Goedken | |
| 2002/0152261 A1 | 10/2002 | Arkin et al. | |
| 2002/0152262 A1 | 10/2002 | Arkin et al. | |
| 2002/0156737 A1 | 10/2002 | Kahn | |
| 2002/0158737 A1 | 10/2002 | Yokoyama | |
| 2002/0186887 A1 | 12/2002 | Rhoads | |
| 2002/0198789 A1 | 12/2002 | Waldman | |
| 2003/0014530 A1 | 1/2003 | Bodin | |
| 2003/0018709 A1 | 1/2003 | Schrempp et al. | |
| 2003/0023852 A1 | 1/2003 | Wold | |
| 2003/0033321 A1 | 2/2003 | Schrempp et al. | |
| 2003/0037010 A1 | 2/2003 | Schmelzer | |
| 2003/0051100 A1 | 3/2003 | Patel | |
| 2003/0061352 A1 | 3/2003 | Bohrer | |
| 2003/0061490 A1 | 3/2003 | Abajian | |
| 2003/0095660 A1 | 5/2003 | Lee et al. | |
| 2003/0135623 A1 | 7/2003 | Schrempp et al. | |
| 2003/0191719 A1 | 10/2003 | Ginter et al. | |
| 2003/0195852 A1 | 10/2003 | Campbell et al. | |
| 2004/0008864 A1 | 1/2004 | Watson et al. | |
| 2004/0010495 A1 | 1/2004 | Kramer et al. | |
| 2004/0053654 A1 | 3/2004 | Kokumai et al. | |
| 2004/0073513 A1 | 4/2004 | Stefik et al. | |
| 2004/0089142 A1 | 5/2004 | Georges et al. | |
| 2004/0133797 A1 | 7/2004 | Arnold | |
| 2004/0148191 A1 | 7/2004 | Hoke, Jr. | |
| 2004/0163106 A1 | 8/2004 | Schrempp et al. | |
| 2004/0167858 A1 | 8/2004 | Erickson | |
| 2004/0201784 A9 | 10/2004 | Dagtas et al. | |
| 2005/0021783 A1 | 1/2005 | Ishii | |
| 2005/0039000 A1 | 2/2005 | Erickson | |
| 2005/0044189 A1 | 2/2005 | Ikezoye et al. | |
| 2005/0097059 A1 | 5/2005 | Shuster | |
| 2005/0154678 A1 | 7/2005 | Schmelzer | |
| 2005/0154680 A1 | 7/2005 | Schmelzer | |
| 2005/0154681 A1 | 7/2005 | Schmelzer | |
| 2005/0216433 A1 | 9/2005 | Bland et al. | |
| 2005/0267945 A1 | 12/2005 | Cohen et al. | |
| 2005/0289065 A1 | 12/2005 | Weare | |
| 2006/0034177 A1 | 2/2006 | Schrempp | |
| 2006/0062426 A1 | 3/2006 | Levy et al. | |
| 2007/0074147 A1 | 3/2007 | Wold | |
| 2007/0078769 A1 | 4/2007 | Way et al. | |
| 2008/0008173 A1 | 1/2008 | Kanevsky et al. | |
| 2008/0133415 A1 | 6/2008 | Ginter et al. | |
| 2008/0141379 A1 | 6/2008 | Schmelzer | |
| 2008/0154730 A1 | 6/2008 | Schmelzer | |
| 2008/0155116 A1 | 6/2008 | Schmelzer | |
| 2009/0031326 A1 | 1/2009 | Wold | |
| 2009/0043870 A1 | 2/2009 | Ikezoye et al. | |
| 2009/0077673 A1 | 3/2009 | Schmelzer | |
| 2009/0089586 A1 | 4/2009 | Brunk | |
| 2009/0192640 A1 | 7/2009 | Wold | |
| 2009/0240361 A1 | 9/2009 | Wold et al. | |
| 2009/0328236 A1 | 12/2009 | Schmelzer | |

FOREIGN PATENT DOCUMENTS

| | | |
|---|---|---|
| EP | 0402210 A1 | 6/1990 |
| EP | 0517405 A2 | 5/1992 |
| EP | 0689316 A2 | 12/1995 |
| EP | 0731446 | 9/1996 |

| | | |
|---|---|---|
| EP | 0859503 | 8/1998 |
| EP | 0459046 | 4/1999 |
| EP | 1354276 B1 | 12/2007 |
| EP | 1485815 B1 | 10/2009 |
| WO | WO 96/36163 A3 | 11/1996 |
| WO | WO 98/20672 A3 | 5/1998 |
| WO | WO 00/05650 A1 | 2/2000 |
| WO | WO 00/39954 A1 | 7/2000 |
| WO | WO 00/63800 A1 | 10/2000 |
| WO | WO 01/23981 A1 | 4/2001 |
| WO | WO 01/47179 A1 | 6/2001 |
| WO | WO 01/52540 A1 | 7/2001 |
| WO | WO 01/62004 | 8/2001 |
| WO | WO 02/03203 | 1/2002 |
| WO | WO 02/15035 A2 | 2/2002 |
| WO | WO 02/37316 A3 | 5/2002 |
| WO | WO 02/082271 A1 | 10/2002 |
| WO | WO 03/007235 A1 | 1/2003 |
| WO | WO 03/009149 A1 | 1/2003 |
| WO | WO 03/036496 A1 | 5/2003 |
| WO | WO 03/067459 A1 | 8/2003 |
| WO | WO 03/091990 A1 | 11/2003 |
| WO | WO 2004/044820 A1 | 5/2004 |
| WO | WO 2004/070558 A2 | 8/2004 |
| WO | WO 2006/015168 A2 | 2/2006 |
| WO | WO 2009/017710 | 2/2009 |

OTHER PUBLICATIONS

Beritelli, F., et al., "Multilayer Chaotic Encryption for Secure Communications in packet switching Networks," IEEE, vol. 2Aug. 2000, pp. 1575-1582.

Blum, T., Keislar, D., Wheaton, J., and Wold, E., "Audio Databases with Content-Based Retrieval," Prodeedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recongnition solution, TRM, to signature its music catabblog for MusicBrainz database," http://www.relatable.com/news/pressrelease/001017.release.html, Oct. 17, 2000.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "A Similarity Measure for Automatic Audio Classification," Institute of Systems Science, National University of Singapore, 1977, Singapore.

Haitsma, J., et al., "Robust Audio Hashing for Content Identification", CBMI 2001, Second International Workshop on Content Based Multimedia and Indexing, Brescia, Italy, Sep. 19-21, 2001.

Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.

Keislar, D., Blum, T., Wheaton, J., and Wold, E., "Audio Analysis for Content-Based Retrieval" Proceedings of the 1995 International Computer Music Conference.

Ohtsuki, K., et al. , "Topic extraction based on continuos speech recognition in broadcast-news speech," Proceedings IEEE Workshop on Automated Speech Recognition and Understanding, 1997, pp. 527-534, N.Y., N.Y., USA.

Packethound Tech Specs, www.palisdesys.com/products/packethount/tck specs/prodPhtechspecs.shtml, 2002.

"How does PacketHound work?", www.palisdesys.com/products/packethound/how_does_it_work/prod_Pghhow.shtml 2002.

Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.

Reynolds, D., et al. , "Robust Text-Independent Speaker Identification Using Gaussian Mixture Speaker Models", *IEEE Transactions on Speech and Audio Procsessing*, vol. 3, No. 1, pp. 72-83 Jan. 1995.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Schneier, Bruce, Applied Cryptography, Protocols, Algorithms and Source Code in C, Chapter 2 Protocol Building Blocks, 1996, pp. 30-31.

Vertegaal, R. and Bonis, E., "ISEE: An Intuitive Sound Editing Environment," Computer Music Journal, 18:2, pp. 21-22, Summer 1994.

Wang, Yao, et al., "Multimedia Content Analysis," IEEE Signal Processing Magazine, pp. 12-36, Nov. 2000, IEEE Service Center, Piscataway, N.J., USA.

Wold, Erling, et al., "Content Based Classification, Search and Retrieval of Audio," IEEE Multimedia, vol. 3, No. 3, pp. 27-36, 1996 IEEE Service Center, Piscataway, N.J., USA.

Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.

European Patent Application No. 02752347.1, Supplementary European Search Report Dated May 8, 2006, 4 pages.

European Patent Application No. 02756525.8, Supplementary European Search Report Dated Jun. 28, 2006, 4 pages.

European Patent Application No. 02782170, Supplementary European Search Report Dated Feb. 7, 2007, 4 pages.

European Patent Application No. 02725522.3, Supplementary European Search Report Dated May 12, 2006, 2 pages.

PCT Search Report PCT/US01/50295, International Search Report dated May 14, 2003, 5 pages.

Business Wire, "Cisco and Fox Host Groundbreaking Screening of Titan A.E.; Animated Epic Will Be First Film Ever to be Digitally Transmitted Over the Internet Monday," Jun. 5, 2000, 08:14 EDT.

Business Wire, "IBM: IBM Announces New Descrambler Software; First To Offer Software To Work With Digital Video Chips," Jun. 5, 25, 1997, 07:49.

Chen, et al., Yong-Cong, A Secure and Robust Digital Watermaking Technique by the Block Cipher RC6 and Secure Hash Algorithm, Department of Computer Science, National Tsing Hua University, 2001.

Gasaway Laura, Close of Century Sees New Copyright Amendments, Mar. 2000, Information Outlook, 4, 3, 42.

Harris, Lesley Ellen, "To register or not," Mar. 2006, Information Outlook, 10, 3, 32(s).

Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.

European Patent Application No. 04706547.9 European Search Report Dated Feb. 25, 2010, 3 pages.

European Patent Application No. 05778109.8 European Search Report Dated Sep. 10, 2010, 7 pages.

PCT Search Report PCT/US02/10615, International Search Report dated Aug. 7, 2002, 5 pages.

PCT Search Report PCT/US02/33186, International Search Report dated Dec. 16, 2002, 6 pages.

PCT Search Report PCT/US04/02748, International Search Report and Written Opinion dated Aug. 20, 2007, 8 pages.

PCT Search Report PCT/US05/26887, International Search Report dated May 3, 2006, 3 pages.

PCT Search Report PCT/US08/09127, International Search Report dated Oct. 30, 2008, 8 pages.

Audible Magic Office Action for U.S. Appl. No. 09/511,632 mailed Dec. 4, 2002.

Audible Magic Office Action for U.S. Appl. No. 09/511,632 mailed May 13, 2003.

Audible Magic Office Action for U.S. Appl. No. 09/511,632 mailed Aug. 27, 2003.
Audible Magic Office Action for U.S. Appl. No. 09/511,632 mailed Feb. 5, 2004.
Audible Magic Notice of Allowance for U.S. Appl. No. 09/511,632 mailed Aug. 10, 2004.
Audible Magic Notice of Allowance for U.S. Appl. No. 10/955,841 mailed Sep. 25, 2006.
Audible Magic Notice of Allowance for U.S. Appl. No. 10/955,841 mailed Mar. 23, 2007.
Audible Magic Notice of Allowance for U.S. Appl. No. 10/955,841 mailed Sep. 11, 2007.
Audible Magic Notice of Allowance for U.S. Appl. No. 10/955,841 mailed Feb. 25, 2008.
Audible Magic Notice of Allowance for U.S. Appl. No. 12/251,404 mailed May 14, 2010.
Audible Magic Office Action for U.S. Appl. No. 08/897,662 mailed Aug. 13, 1998.
Audible Magic Notice of Allowance for U.S. Appl. No. 08/897,662 mailed Jan. 29, 1999.
Audible Magic Office Action for U.S. Appl. No. 09/706,227 mailed May 5, 2004.
Audible Magic Office Action for U.S. Appl. No. 09/706,227 mailed Nov. 12, 2004.
Audible Magic Office Action for U.S. Appl. No. 09/706,227 mailed May 9, 2005.
Audible Magic Office Action for U.S. Appl. No. 09/706,227 mailed Nov. 1, 2005.
Audible Magic Office Action for U.S. Appl. No. 09/706,227 mailed Jun. 23, 2006.
Audible Magic Office Action for U.S. Appl. No. 09/706,227 mailed Nov. 7, 2006.
Audible Magic Office Action for U.S. Appl. No. 09/706,227 mailed Mar. 29, 2007.
Audible Magic Office Action for U.S. Appl. No. 09/706,227 mailed Sep. 17, 2007.
Audible Magic Office Action for U.S. Appl. No. 09/706,227 mailed May 29, 2008.
Audible Magic Office Action for U.S. Appl. No. 09/706,227 mailed Jan. 9, 2009.
Audible Magic Office Action for U.S. Appl. No. 10/192,783 mailed Dec. 13, 2004.
Audible Magic Notice of Allowance for U.S. Appl. No. 10/192,783 mailed Jun. 7, 2005.
Audible Magic Office Action for U.S. Appl. No. 11/239,543 mailed Apr. 23, 2008.
Audible Magic Notice of Allowance for U.S. Appl. No. 11/239,543 mailed Nov. 6, 2008.
Audible Magic Notice of Allowance for U.S. Appl. No. 11/239,543 mailed Feb. 25, 2009.
Audible Magic Office Action for U.S. Appl. No. 12/410,445 mailed Aug. 10, 2010.
Audible Magic Notice of Allowance for U.S. Appl. No. 12/410,445 mailed Oct. 20, 2010.
Audible Magic Office Action for U.S. Appl. No. 09/910,680 mailed Nov. 17, 2004.
Audible Magic Office Action for U.S. Appl. No. 09/910,680 mailed May 16, 2005.
Audible Magic Office Action for U.S. Appl. No. 09/910,680 mailed Sep. 29, 2005.
Audible Magic Office Action for U.S. Appl. No. 09/910,680 mailed Jun. 23, 2006.
Audible Magic Office Action for U.S. Appl. No. 09/910,680 mailed Aug. 8, 2006.
Audible Magic Office Action for U.S. Appl. No. 09/910,680 mailed Jan. 25, 2007.
Audible Magic Office Action for U.S. Appl. No. 09/910,680 mailed Dec. 5, 2007.
Audible Magic Office Action for U.S. Appl. No. 09/999,763 mailed Apr. 6, 2005.
Audible Magic Office Action for U.S. Appl. No. 09/999,763 mailed Oct. 6, 2005.
Audible Magic Office Action for U.S. Appl. No. 09/999,763 mailed Apr. 7, 2006.
Audible Magic Office Action for U.S. Appl. No. 09/999,763 mailed Oct. 6, 2006.
Audible Magic Office Action for U.S. Appl. No. 09/999,763 mailed Mar. 7, 2007.
Audible Magic Office Action for U.S. Appl. No. 09/999,763 mailed Aug. 20, 2007.
Audible Magic Office Action for U.S. Appl. No. 09/999,763 mailed Jan. 7, 2008.
Audible Magic Office Action for U.S. Appl. No. 09/999,763 mailed Jun. 27, 2008.
Audible Magic Office Action for U.S. Appl. No. 09/999,763 mailed Dec. 22, 2008.
Audible Magic Office Action for U.S. Appl. No. 09/999,763 mailed Jul. 20, 2009.
Audible Magic Office Action for U.S. Appl. No. 09/999,763 mailed Dec. 21, 2009.
Audible Magic Office Action for U.S. Appl. No. 09/999,763 mailed Jun. 23, 2010.
Audible Magic Office Action for U.S. Appl. No. 09/999,763 mailed Sep. 16, 2010.
Audible Magic Office Action for U.S. Appl. No. 10/072,238 mailed May 3, 2005.
Audible Magic Office Action for U.S. Appl. No. 10/072,238 mailed Oct. 25, 2005.
Audible Magic Office Action for U.S. Appl. No. 10/072,238 mailed Apr. 25, 2006.
Audible Magic Office Action for U.S. Appl. No. 10/072,238 mailed Sep. 19, 2007.
Audible Magic Office Action for U.S. Appl. No. 10/072,238 mailed Apr. 7, 2008.
Audible Magic Office Action for U.S. Appl. No. 10/072,238 mailed Oct. 1, 2008.
Audible Magic Office Action for U.S. Appl. No. 10/072,238 mailed Jan. 9, 2009.
Audible Magic Office Action for U.S. Appl. No. 10/072,238 mailed Mar. 31, 2009.
Audible Magic Office Action for U.S. Appl. No. 10/072,238 mailed Aug. 6, 2010.
Audible Magic Office Action for U.S. Appl. No. 11/116,710 mailed Dec. 13, 2004.
Audible Magic Office Action for U.S. Appl. No. 11/116,710 mailed Apr. 8, 2005.
Audible Magic Office Action for U.S. Appl. No. 11/116,710 mailed Oct. 7, 2005.
Audible Magic Office Action for U.S. Appl. No. 11/116,710 mailed Apr. 20, 2006.
Audible Magic Office Action for U.S. Appl. No. 11/116,710 mailed Jul. 31, 2006.
Audible Magic Office Action for U.S. Appl. No. 11/116,710 mailed Jan. 16, 2007.
Audible Magic Notice of Allowance for U.S. Appl. No. 11/116,710 mailed Nov. 19, 2007.
Audible Magic Notice of Allowance for U.S. Appl. No. 12/042,023 mailed Dec. 29, 2008.
Audible Magic Notice of Allowance for U.S. Appl. No. 12/042,023 mailed Jun. 25, 2009.
Audible Magic Notice of Allowance for U.S. Appl. No. 12/042,023 mailed Mar. 8, 2010.
Audible Magic Office Action for U.S. Appl. No. 11/048,307 mailed Aug. 22, 2007.
Audible Magic Office Action for U.S. Appl. No. 11/048,307 mailed May 16, 2008.
Audible Magic Notice of Allowance for U.S. Appl. No. 11/048,307 mailed May 29, 2009.
Audible Magic Office Action for U.S. Appl. No. 12/488,504 mailed Nov. 10, 2010.
Audible Magic Office Action for U.S. Appl. No. 11/048,308 mailed Feb. 25, 2008.
Audible Magic Office Action for U.S. Appl. No. 11/048,308 mailed Mar. 5, 2009.

Audible Magic Notice of Allowance for U.S. Appl. No. 11/048,308 mailed Aug. 7, 2009.
Audible Magic Office Action for U.S. Appl. No. 11/048,338 mailed Apr. 18, 2007.
Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan. 7, 2009.
Audible Magic Office Action for U.S. Appl. No. 11/048,338 mailed Jul. 6, 2009.
Audible Magic Office Action for U.S. Appl. No. 11/048,338 mailed Dec. 28, 2009.
Audible Magic Office Action for U.S. Appl. No. 11/048,338 mailed Jun. 24, 2010.
Audible Magic Office Action for U.S. Appl. No. 12/035,599 mailed Nov. 17, 2008.
Audible Magic Office Action for U.S. Appl. No. 12/035,599 mailed May 29, 2009.
Audible Magic Office Action for U.S. Appl. No. 12/035,599 mailed Nov. 24, 2009.
Audible Magic Office Action for U.S. Appl. No. 12/035,599 mailed Jun. 9, 2010.
Audible Magic Office Action for U.S. Appl. No. 12/035,609 mailed Dec. 29, 2008.
Audible Magic Office Action for U.S. Appl. No. 12/035,609 mailed Jun. 24, 2009.
Audible Magic Notice of Allowance for U.S. Appl. No. 12/035,609 mailed Dec. 11, 2009.
Audible Magic Notice of Allowance for U.S. Appl. No. 12/277,291 mailed May 12, 2010.
Audible Magic Office Action for U.S. Appl. No. 10/356,318 mailed May 24, 2006.
Audible Magic Office Action for U.S. Appl. No. 10/356,318 mailed Nov. 2, 2006.
Audible Magic Office Action for U.S. Appl. No. 10/356,318 mailed Apr. 11, 2007.
Audible Magic Office Action for U.S. Appl. No. 10/356,318 mailed Nov. 1, 2007.
Audible Magic Office Action for U.S. Appl. No. 10/356,318 mailed May 9, 2008.
Audible Magic Office Action for U.S. Appl. No. 10/356,318 mailed Jan. 6, 2009.
Audible Magic Office Action for U.S. Appl. No. 10/356,318 mailed Jun. 15, 2009.
Audible Magic Office Action for U.S. Appl. No. 10/356,318 mailed Jan. 21, 2010.
Audible Magic Office Action for U.S. Appl. No. 11/191,493 mailed Jul. 17, 2008.
Audible Magic Office Action for U.S. Appl. No. 11/191,493 mailed Jan. 9, 2009.
Audible Magic Office Action for U.S. Appl. No. 11/191,493 mailed Apr. 28, 2009.
Audible Magic Office Action for U.S. Appl. No. 11/191,493 mailed Nov. 19, 2009.
Audible Magic Office Action for U.S. Appl. No. 11/191,493 mailed May 25, 2010.
Audible Magic Office Action for U.S. Appl. No. 11/191,493 mailed Oct. 4, 2010.
Audible Magic Office Action for U.S. Appl. No. 11/923,491 mailed Nov. 12, 2010.

* cited by examiner

Outer loops of list matching process

Low-level comparison

ERROR BOUND #1

ERROR BOUND #2

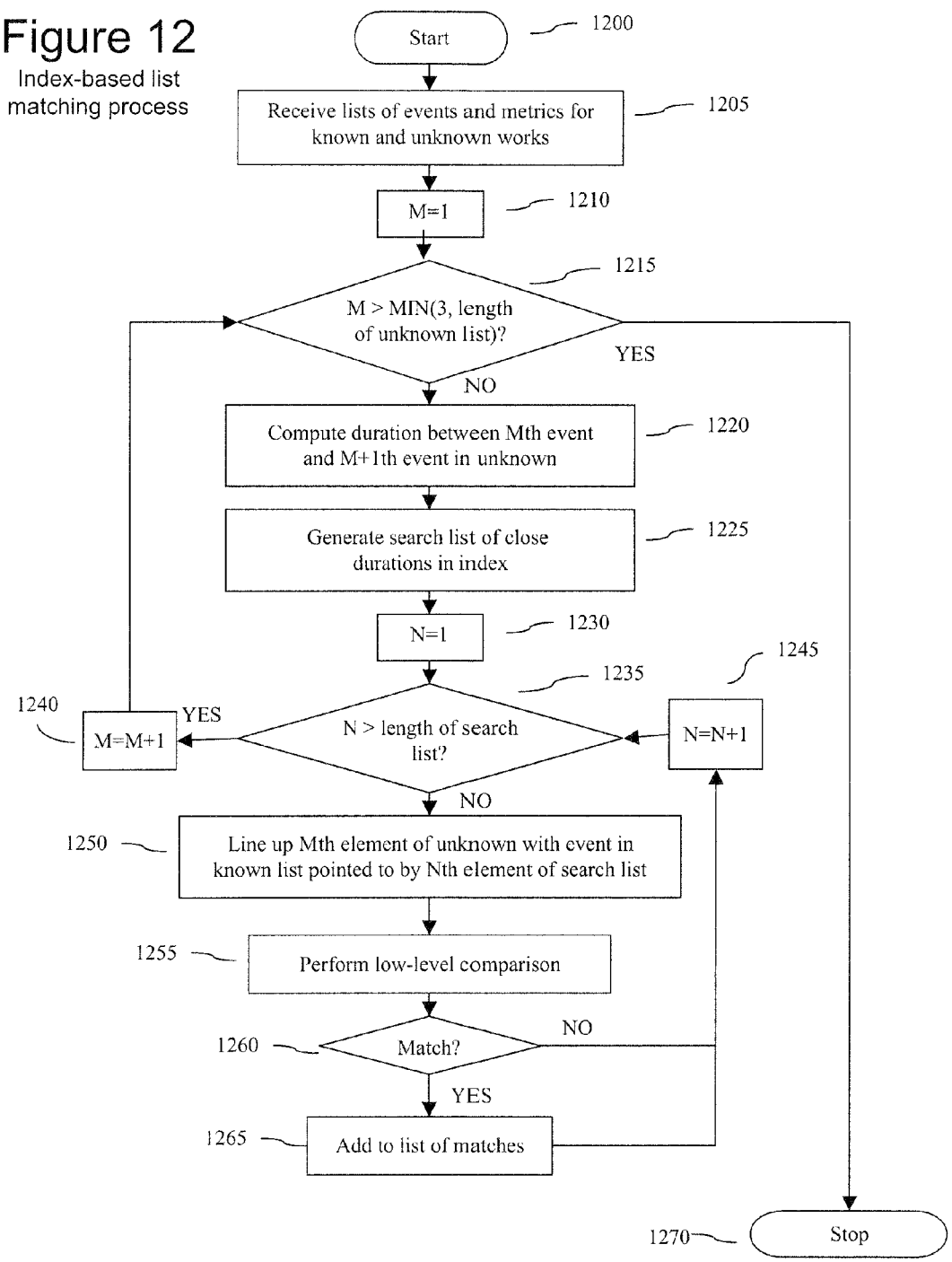

SYSTEM FOR IDENTIFYING CONTENT OF DIGITAL DATA

FIELD OF THE INVENTION

This invention relates to identifying content of digital data. More particularly, this invention relates to identifying a work represented as digital data from an arbitrary segment of the digital data representing the content of the work in a memory of a digital processing unit. Still more particularly, this invention relates to detecting particular events in the segment of data and the time between events and comparing the time between events to the time between events in known works to determine the identity of the work that the segment of data represents.

PRIOR ART

In the past few years, the Internet has become a popular medium for distributing or in some other way transferring works between users. For purposes of this discussion, a work is any piece of art or work product that varies over time and is placed on a medium for distribution. More particularly, a work is a piece of art or work product that is placed in an electronic medium for use and/or distribution. Furthermore, a registered work is a work for which the identity of the work is known. Recently, many web sites have been offering more video works for viewing and transfers to viewers. For example, the web site YouTube.com provides clips of video data that users submit for other viewers to download and view. For purposes of this invention, some of the clips submitted by viewers are a portion of a copyrighted work such as a television show or movie. Owners of copyrighted works are often not compensated by the website owners or the users for the reproduction of the work. Thus, owners of the works seek either to prevent these web sites for providing the clips of their works or receive compensation for reproduction of their works.

Also, as Digital Video Disks (DVDs) have become more popular, the downloading and unauthorized reproduction of video works has become a problem. There is a booming market for pirated or unauthorized reproductions of video works. In the past, makers of DVDs have tried to use encryption and other methods to prevent unauthorized reproduction of the works. However, most of the methods devised to prevent unauthorized use have been overcome or circumvented by hackers. Thus, owners of the works seek ways to either detect the unauthorized work and receive compensation or prevent the reproduction.

In the past, those skilled in the art have made many advances in detecting the identity of audio works. One example, a reliable method for identifying audio works, is given in U.S. Pat. No. 5,918,223 issued to Blum et al. (Blum) which is hereby incorporated by reference as if set forth herewith. In Blum, fingerprints of segments of audio data of an unknown work are generated and compared to fingerprints of data of known works until a match is found. The fingerprints can be one or more of any number of attributes of audio contents. Some examples of audio attributes include, but are not limited to pitch, frequency spectra, and mel-filtered cepstral coefficients. This method is very reliable in identifying audio works.

However, those skilled in the art have yet to find an efficient and reliable method for identifying video works. One method that has proven promising for identifying video works is the use of scene change events. Data for an unknown video work is read and the scene change events are detected. A metric such as the time between events or frames between the events is determined. For purposes of this discussion, a scene change event is one or more empty frames between different colored frames and/or significant changes in the visual between two adjacent frames or significant change in visual content over a small amount of time. Any event may be used as long as detection is easily repeatable. The sequence of metrics between the events of the unknown work are then compared to a list of metrics between events for known works until a sufficient match is made and the unknown work is identified.

There are several problems with the above-identified method of video work identification. The above method of identifying works is reliable when the unidentified work is a direct copy of an identified work. However, this method is not reliable when a copy of the video work is not a direct copy of the video work. For purposes of this discussion, a direct copy is a copy of a work that includes all of the visual data of the copied video work presented in the same manner as created by the owner of the work. Furthermore, an indirect copy is a copy of video work that has the data modified from the original work. Indirect copies can be made in many different manners. Some examples include but are not limited to reformatting of the data, such as from letter box to conventional format; recording the video work in a second medium, such as video taping a movie from a scene at a theater; copying only a portion of the data; noise introduced in the routine broadcasting of the work; format conversions that occur such as telecining, digitizing, compressing, digital-analog-digital resampling, keystoning, rotation translation, playback rate changes, and the myriad of other common transformations commonly known in the art.

Typically, an indirect copy has a different video quality from the original work. Thus, some scene change events in an indirect copy may not be detected or other scene change events caused by the copying method may be detected. In addition, because of time scaling and/or playback rate changes, the time between detected events in the original work and the indirect copy may vary. Thus, the list of metrics for the unknown copy is different from the list for the original work and the above-described method may not detect the match.

Thus, those skilled in the art are constantly striving to find a new method that is more reliable for identifying the unidentified work.

SUMMARY OF THE INVENTION

The above and other methods are solved and an advance in the art is made by a video identification system in accordance with this invention. A first advantage of a system in accordance with this invention is that indirect copies can be identified with an improved confidence level. A second advantage of a system in accordance with this invention is that the system provides an efficient method to identify an unknown work that can be used during data transfers without unduly hampering the transfer of data between two digital processing systems. A third advantage of this invention is that even if the unidentified work is only a portion of an original work, it can be identified accurately. A fourth advantage of this invention is that this technique can be applied to match any series of events detected over time if the path to one detector introduces significant noise or errors into the stream of data.

Sometimes, the list for an unknown work must be compared to multiple lists of known works until a match is found. In some embodiments, the works most likely to match the unknown work are selected for testing. Sometimes more data than is needed to identify an unknown work is received. Thus, the system selects a portion of data from the segment to test. The received data may come from data stored in a memory, data being broadcast over a network, or data being passed between systems connected over a network. Sometimes the data may also be read from a medium.

In some embodiments, the system determines whether the unknown work is an authorized copy of a known work when the unknown work is identified. The system may then generate a report stating whether the unknown work is an authorized or unauthorized copy of the known work. In some embodiments, a business rule is performed in response to a determination that the unknown work is an unauthorized copy. In some embodiments the business rule may direct that the copy be degraded in quality or altered in a plurality of ways.

In some embodiments, a secondary test is performed responsive to a determination that the unknown work is a copy of a known work from comparing lists. In other embodiments, a secondary test is performed on the unknown work when the results of the list comparisons are inconclusive. In still other embodiments, a secondary test is performed when no matches are found using the list comparisons.

In some embodiments of this invention, the comparison of the lists is performed in the following manner. First the system receives the list of metrics of the unknown work and the list of metrics of the known work. The system then determines a number of events in the list of metrics for the unknown work that match events in the list of metrics for the known work. The number of matches is then compared to a threshold. If the number of matches is greater than the threshold, a match between the lists is determined.

The comparison of elements of the list may be performed in the following manner. The system aligns an Mth element of the list of metrics of the unknown work with an Nth element of the list of metrics for the known work. The system then performs a first comparison of the lists starting from the Mth element in the list of metrics for the unknown list and the Nth element in the list of metrics for the known work. The system then determines whether the lists match from the Mth element and the Nth element in the respective lists.

This may be repeated iteratively to determine whether there is a match. The lists starting from the Mth and Nth elements may be compared in the following manner. The lists may be compared one element at time starting from the Mth and Nth elements and the system determines the number of elements that match. This number is compared to a threshold and a match is determined if the number of matching elements surpasses the threshold. In some embodiments a number of misses is recorded and the lists are determined not to match if the number of misses exceeds a miss threshold.

In some embodiments the comparison of lists may begin by generating a list of associated pairs wherein each pair consists of an element from the list of metrics of the unknown work and a matching element from the list of metrics of the known work, where a matching element in the known work is an element whose metric is within an error tolerance of the metric for the associated element in the unknown work. A regression line is computed through the associated pairs in the new list. The regression error associated with this line is then used, along with the total number of hits and misses, to determine whether there is a match.

In other embodiments, a regression error is calculated from the computation of said regression line, the regression error is then compared to a regression error threshold. A match is determined when the regression error is less than the regression error threshold.

In other embodiments, a weighted error is calculated from the computation of the regression line. The weighted error is then compared to a weighted error threshold. A match is determined when the weighted error is less than the weighted error threshold.

In other embodiments, a miss ratio is calculated from the computation of said regression line, the miss ratio is then compared to a miss ratio threshold. A match is determined when the miss ratio is less than the miss ratio threshold.

In other embodiments, a weighted miss ratio is calculated from the computation of the regression line, the weighted miss ratio is then compared to a weighted miss ratio threshold. A match is determined when the weighted miss ratio is less than the miss ratio threshold. In other embodiments, a plurality of the error measures described above may be used to determine a match.

BRIEF DESCRIPTION OF THE DRAWINGS

The above and other features and advantages of a system in accordance with this invention are described in the Detailed Description below and are shown in the following drawings:

FIG. 12 illustrating a block diagram of a second exemplary embodiment of a process for comparing a list of events and metrics from an unknown work with a list of events and metrics of known work in accordance with this invention.

DETAILED DESCRIPTION

This invention relates to identification of an unknown work from digital data representing the content of the unknown work. For purposes of this discussion, a work is any piece of art or work product that is placed on medium for distribution. More particularly, a work is a piece of art or work product that is placed in an electronic medium for use and/or distribution. Furthermore, a registered work is a work for which the identity of the work is known and the time between events in the data of the work is known.

This identification system is based upon measuring a metric between events in works and comparing the metric between events in a known work and an unknown work. For purposes of this discussion, an event is a perceptual occurrence in a work that can be positioned in time. For example in an audio work, a cymbal strike may be an event that occurs at a certain time in an audio work. In a video work, an event may be a scene change where the pixels between frames change substantially; a blank frame preceding and/or following a non-blank frame; a frame having pixels that have one color distribution preceding or following a frame having a different color distribution; a short series of frames which begin with pixels having one color distribution and ends with pixels having a substantially different color distribution. Furthermore, for purposes of this discussion, a metric is a measurement between events. Some examples include time between events, number of frames between events, or any other easily measured attribute of the works being compared. For purposes of comparing video works, the time between events has been found to be the most dependable metric. It has been found that the time between events, which in the case of video scene changes is also known as the scene length, does not change as the format of the work is changed. In addition, the ratio between neighboring scene lengths does not change as the playback rate is changed. While a method in accordance with this invention is particularly reliable for identifying video works, one skilled in the art will recognize that this system may be used to identify other types of works and event streams as well.

This invention relates to identifying works from digital data representing the content of the work. For purposes of this discussion, content of a work is the data that actually is the representation of the work and excludes metadata, file headers or trailers or any other identification information that may be added to digital representations of the works to identify the work.

Figure 1:
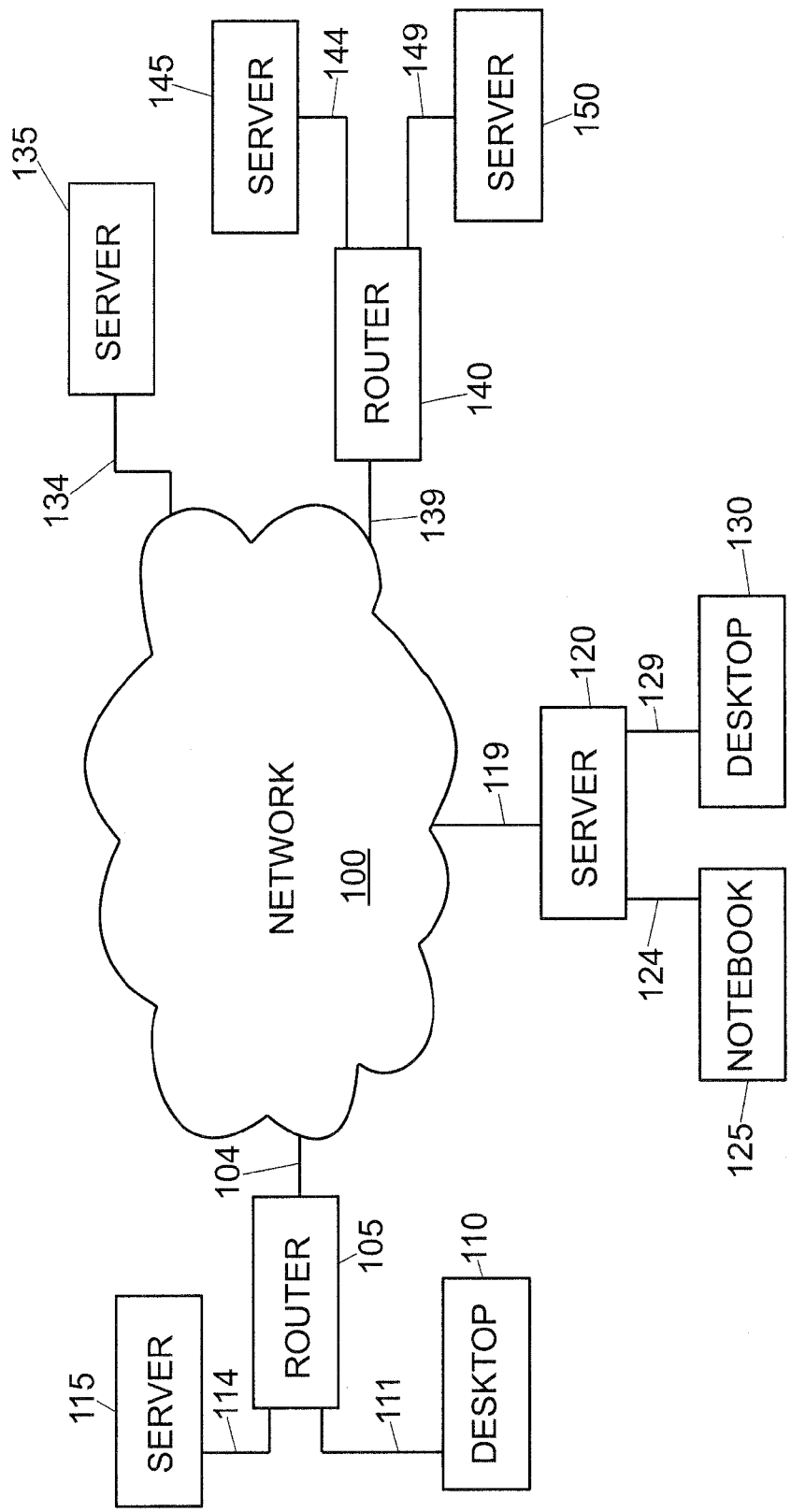
FIG. 1 illustrating a block diagram of a network including at least one digital processor executing an identification system in accordance with this invention.

FIG. 1 illustrates a network 100 that may include digital processing systems that execute instructions for performing the processes for identifying a work in accordance with this invention. Network 100 may be an Internet or Intranet connecting digital processing systems to allow the systems to transfer data between one another. One skilled in the art will recognize that a system of identifying an unknown work may be stored and executed in any processing system in the network. Furthermore, the shown components are merely examples of digital systems in a network and the exact configuration of a network is left to those skilled in the art.

In network 100, router 105 connects to network 100 via path 104. Router 105 is a conventional router that connects multiple processing systems to a network and handles data transfers to the connected systems. Path 104 is a T-1 line cable, fiber optic or other connection to another system in network 100. Desktop computer 110 and server 115 connect to router 105 via paths 111, and 114 respectively. Server 115 is a conventional server that may store data to provide data and applications to other systems such as desktop 110 connected to a local network. Typically, path 114 is an Ethernet, cable or other connection to router 105. Desktop 110 is a conventional personal computer connected to network 100. Path 111 may be an Ethernet, cable, Radio Frequency or the connection that allows communication between desktop 110 and router 105. One skilled in the art will recognize that more than two systems may be connected to router 105. The number of connections is only limited by the capacity of router 105.

Server 120 connects to network 100 via path 119. Server 120 is a conventional server that has multiple other systems connected to the server and provides network access to the connected systems. Path 119 is a T-1, telephonic, fiber optic or other type of connection between server 120 and another system in network 100. Notebook 12 and desktop computer 130 connect to server 120 via paths 124 and 129 respectively. Notebook computer 125 and desktop computer 130 are conventional personal computer systems. Paths 124 and 129 may be an Ethernet, cable, Radio Frequency or the connection that allows communication between the systems and server 120.

Router 140 connects to network 100 via path 139. Router 140 is a conventional router that connects multiple processing systems to a network and handles data transfers to the connected systems. Path 139 is T-1 line cable, fiber optic or other connection to another system in network 100. Server 145 and 150 connect to router 140 via paths 144 and 149 respectively. Servers 145 and 150 are typical servers that provide contents such as web site or other web accessible files to other users over the network. Typically, paths 144 and 149 are an Ethernet, cable or other connection to router 140.

Server 135 is also a server that provides content to users over network 100. Server 135 connects to at least one other system in network 100 via path 134. Path 134 is a T-1 line cable, fiber optic or other connection to another system in network 100. One skilled in the art will recognize that these are merely exemplary connections and the exact configurations are left to the network administrator as being outside the scope of this invention.

Figure 2:
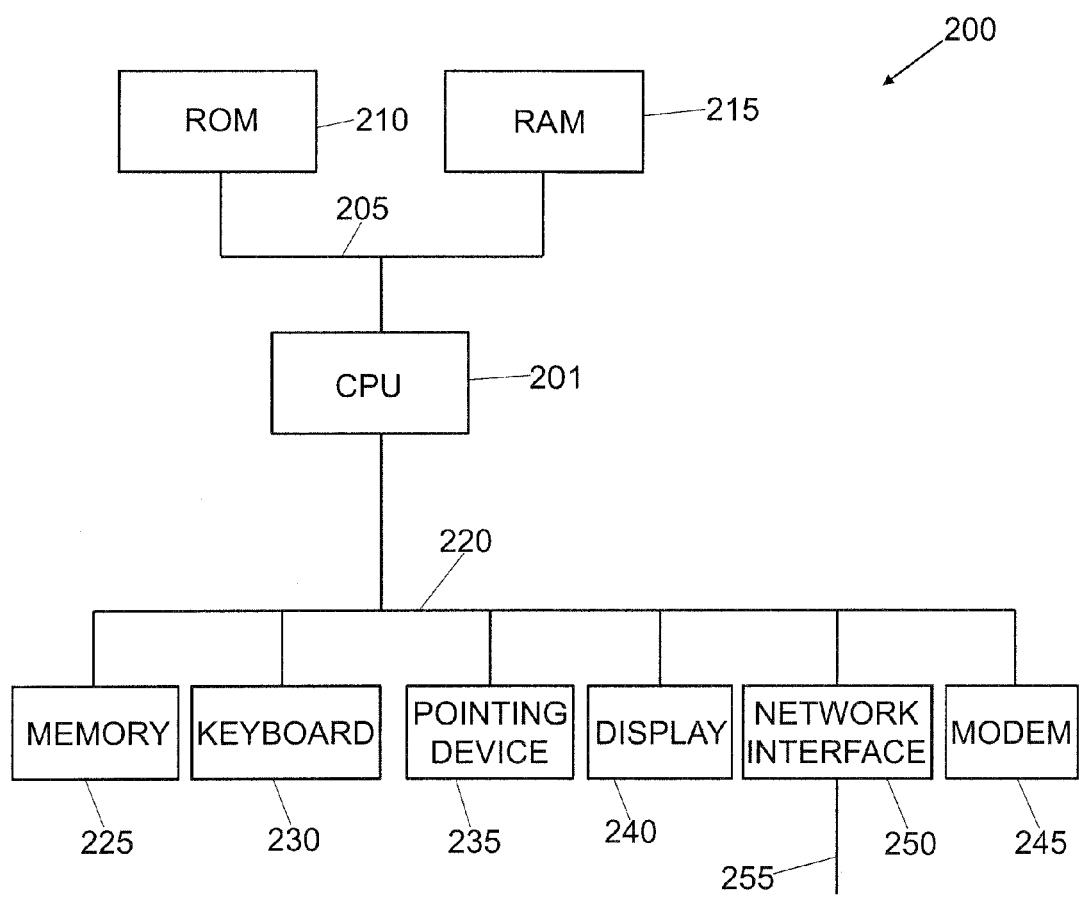
FIG. 2 illustrating a block diagram of components of a digital processing system executing an identification system in accordance with this invention.

FIG. 2 illustrates a block diagram of the basic components of a processing system that can execute the applications to provide an identification system in accordance with this invention. One skilled in the art will recognize that this is merely an exemplary system and that the exact configuration of each processing system may be different in accordance with the requirements for the system.

Processing system 200 includes a Central Processing Unit (CPU) 201. CPU 201 is a processor, microprocessor, or a group of a combination of processors and/or microprocessors. Each processor and/or microprocessor includes registers and other circuitry for executing instructions stored in a memory to provide applications for processing data. The CPU 201 may also include firmware, which is circuitry that stores instructions for various applications.

Memory bus 205 connects CPU 201 to memories for storing executable instructions and data for applications being executed by CPU 201. A non-volatile memory such as Read Only Memory (ROM) 210 may be connected to memory bus 205. ROM 210 stores instructions for drivers and configuration data for processing system 200. A volatile memory, such as Random Access Memory (RAM) 215 is also connected to memory bus 205. RAM 215 stores data and instructions for applications being executed by CPU 201. One skilled in the art will recognize that other types of volatile memory SRAM and DRAM may also be connected. One skilled in the art will also recognize that memory caches may also be included in the memories and CPU modules.

Input/Output bus 220 connects CPU 201 to peripheral devices for transmission of data between CPU 201 and the peripheral devices. Examples of peripheral devices that may be connected to I/O bus 220 include memory 225, keyboard 230, pointing device 235, display 240, modem 245, and network connector 250. Those skilled in the art will recognize that these devices are shown for exemplary purposes and any of the devices may not be included in a processing system or other device may be included.

Memory 225 is a device for storing data and instructions for applications on a media. Memory 225 may include a disk drive for reading and writing data to a magnetic media, or an optical device for reading and/or writing data to in an optical format to an optical media such as a compact disc. Keyboard 230 is a device receiving alphanumeric data from a user. Pointing device 235 is a mouse; touch pad or other such device used to receive input for moving an icon or "pointer" across a display. Display 240 is a device that receives data from the processing unit and displays the data on a monitor. Modem 245 is a device that connects to a telephone and converts digital data to analog signals for transmission over the telephone line. Network device 250 is a device that connects system 200 to a network to send and receive data over the network. An example of a network device 250 is an "Ethernet Card" which includes circuitry for connecting to a network.

FIGS. 3-8 are flow diagrams of a process for identifying a work in accordance with this invention. These processes are embodied as instructions in hardware, software and/or firmware. The instructions are then executed by a digital processing system to provide the processes as shown in the flow diagrams. One skilled in the art will recognize that any processing system may use the following processes with minor changes to the steps described. Some envisioned uses include, but are not limited to, placing the system on a router to prevent end users connected to the router from transmitting or receiving unauthorized copies of a copyrighted work; placing the system on a server that provides user downloaded content over the network to ensure that unauthorized copies of copyrighted works are not provided by the server; placing the system in an Internet browser to prevent unauthorized transfers of copyrighted works; placing the system in peer to peer software to prevent unauthorized transfers of copyrighted works; and as an utility application on a personal computer to prevent unauthorized transfers of copyrighted works.

FIGS. 3-6 provide flow diagrams of four exemplary embodiments of a system in accordance with this invention. One skilled in the art will recognize that individual features of any of the four embodiments may be combined in a system that operates in accordance with this invention.

Figure 3:
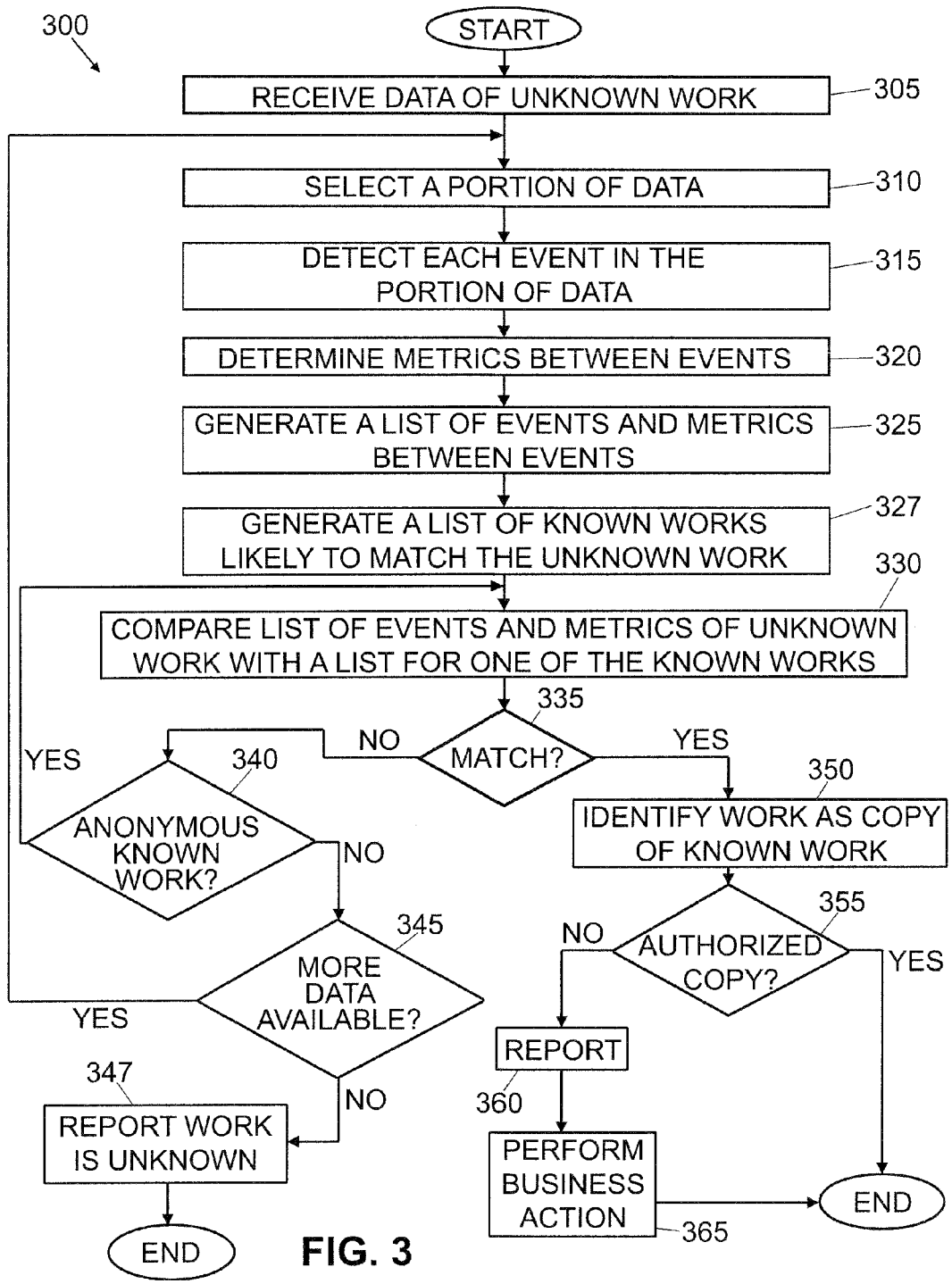
FIG. 3 illustrating a block diagram of a first exemplary embodiment of an identification process in accordance with this invention.

FIG. 3 illustrates a first exemplary process 300 for providing an identification system in accordance with this invention. Process 300 begins in step 305 when the process receives data for content of an unknown digital work. The data may be received in any number of ways including but not limited to reading the data from a medium, reading the data from memory, or extracting the data from packets being transmitted over the network. In the preferred exemplary embodiment, the unknown work is a video work. In order to have the best chance of successfully determining the identity of the work, the system requires enough data to provide a sufficient amount of events in the video from the data. For other forms of works differing amounts of data may be needed.

In step 310, a portion of the received data is selected. This is an optional step, but, for example, if the user of this invention desires to determine whether this unknown data matches in its entirety some portion of one of the known references, said portion could be the entire received data. As another example, if the user of the invention desires to determine whether any arbitrary portion of the unknown work matches some portion of one of the references, they could specify a region of the unknown work to be examined. By calling process 300 repeatedly, a user could determine if any arbitrary portion of the received data is contained in the known reference. This could be useful if the received data were an edited collection or collage of known material. Also, the computational cost of the process can be lessened if one looks only at a portion of the received data. In step 315, the monitored events are detected in the portion of data. When applied to video works typically scene changes are the event detected. However, other events may be used such as frames in which one color is predominate.

Next, a metric between each successive event is determined in step 320. When applied to video works time between events is typically the most successful metric. However, other metrics such as numbers of frames or other attributes may be used. In step 325 a list of events as well as time from the last event is generated. In step 327, a set of known works is generated which are likely to contain the unknown work. This may be as simple as selecting all the known works in a large database or may be more sophisticated. For example, if it is known a priori that the unknown work is a television episode, said set of known works could consist only of all available television episodes. Limiting the number of known works reduces the computational cost. Also, these known works would typically be analyzed and reduced to event lists beforehand and stored in a database.

In step 330, an iterative process begins by comparing the list of events and metrics of the unknown work to a list of metrics of a known reference work. A more complete description of a preferable comparing process is given below in FIGS. 7 through 12. The list of events metrics for each known work is stored in a database or other memory for use. The process then determines if there is a match between the lists. If there is not a match, process 300 determines whether there is another identified work to test. If so, the process is repeated from step 330. If there is not another identified work to test, step 345 determines whether there is more data of the unidentified work to test. If there is more data, the process repeats from step 310. Otherwise there is no match and a report showing the work is unknown is generated in step 347 and process 300 ends.

If there is a match between the identified work and the unknown work in step 335, the unknown work is reported as identified as the known work in step 350. In step 355, process 300 determines whether the newly identified work is an authorized copy. This may be done in any number of manners depending on how the data for the work was received. For example if the data was read from packets, the source and destination addresses may be used. The mode of delivery may also be used or any other number of methods may be used. If it is determined that the work is an authorized copy, process 300 ends. Otherwise, a report of the unauthorized copy is reported in step 360 and in an optional step 365 a business rule may be applied to the unauthorized copy. Some examples of actions that may be taken include erasing the work from the memory, blocking transmission of packets carrying the data, and degrading the data to make the unauthorized copy unusable. Process 300 then ends.

Figure 4:
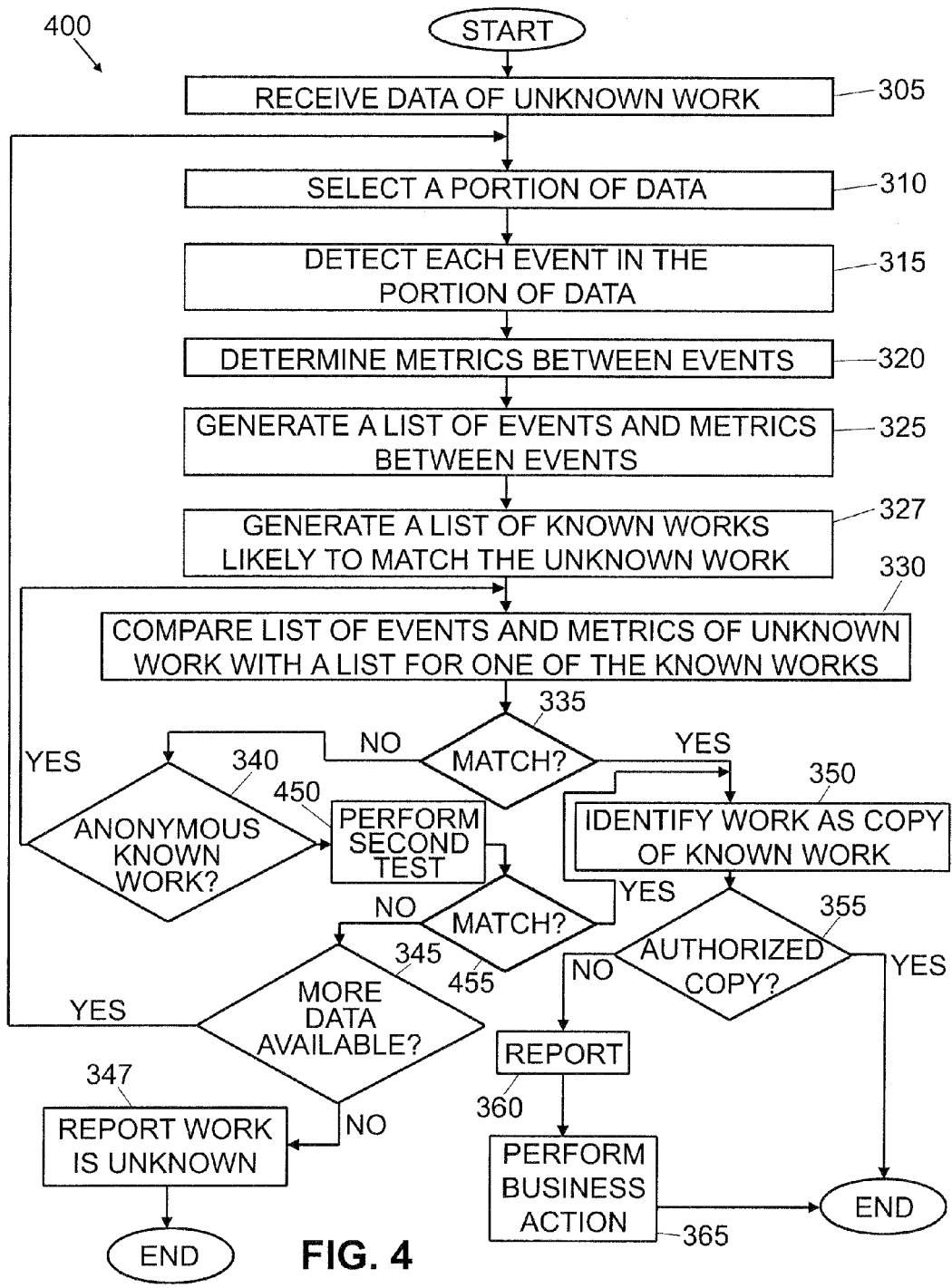
FIG. 4 illustrating a block diagram of a second exemplary embodiment of an identification process in accordance with this invention.

FIG. 4 illustrates process 400 that is a second exemplary embodiment of this invention. Process 400 has substantially the same steps as process 300. However process 400 executes the following steps to see if a match can be made. In response to there not being another identified work in step 340, process 400 performs a secondary test on the selected portion data in step 450. In some embodiments, the test may be using the method described in the Blum patent to compare the audio portion of a work with the audio portions of the identified works.

If there is no match in the secondary test, process 400 repeats the process from step 345 as described above. If there is a match between the identified work and the unknown work in step 450 the unknown work is reported as identified as the known work in step 455. In step 460, process 400 determines whether the newly identified work is an authorized copy. This may be done by any number of methods depending on how the data for the work was received. For example if the data was read from packets, the source and destination addresses may be used. The mode of delivery may also be used or any other number of methods may be used. If it is determined that the work is an authorized copy, process 400 ends. Otherwise, a report of the unauthorized copy is reported in step 465 and in an optional step 470 a business rule may be applied to the unauthorized copy. Some examples of actions that may be taken include erasing the work from the memory, blocking transmission of packets carrying the data, and degrading the data to make the unauthorized copy unusable. Process 400 then ends.

Figure 5:
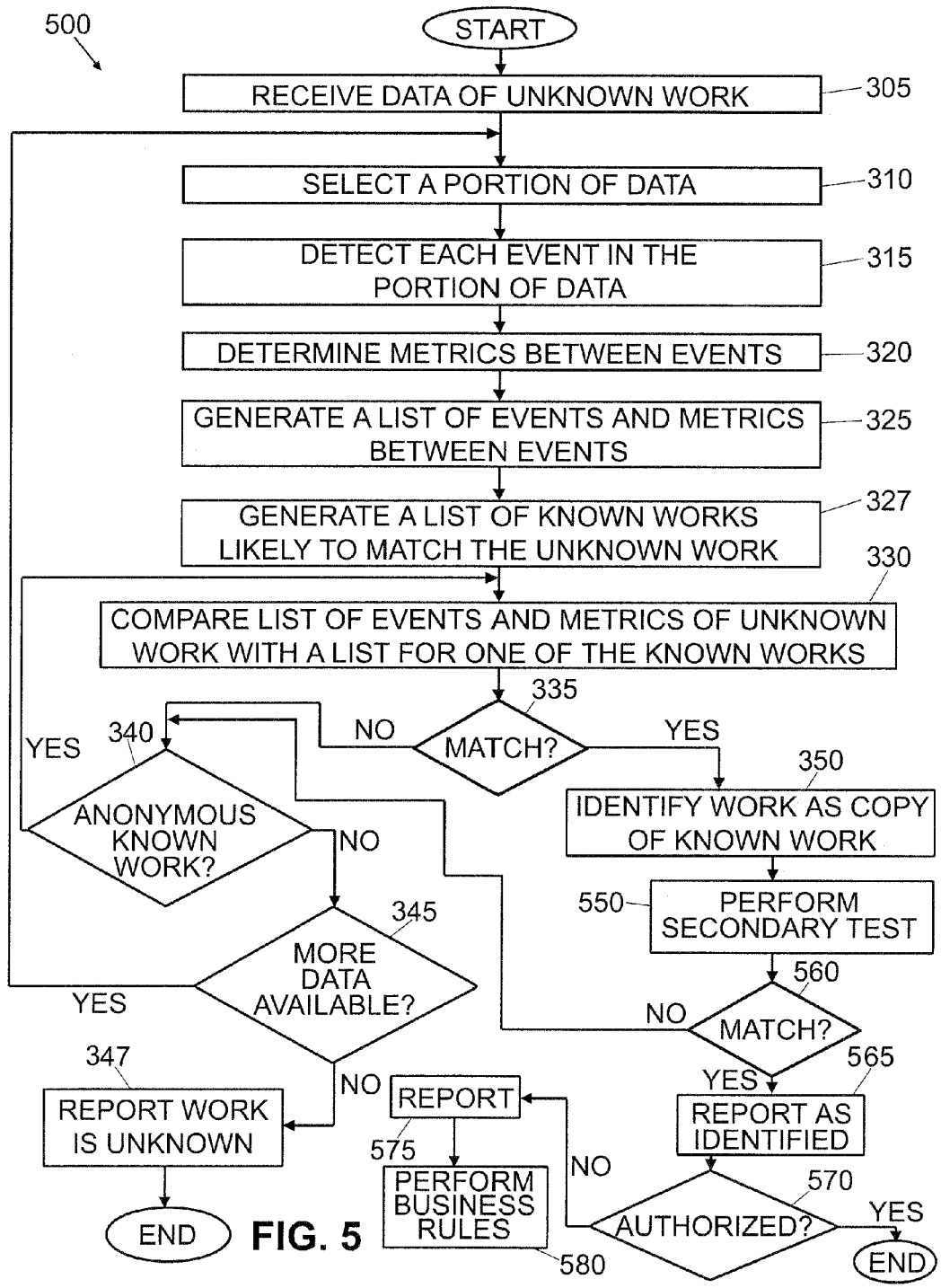
FIG. 5 illustrating a block diagram of a third exemplary embodiment of an identification process in accordance with this invention.

FIG. 5 illustrates process 500 that is a third exemplary embodiment. Process 500 has the same steps as process 300 until step 350. If there is a match, a secondary test is made to confirm the identity of the unknown work.

After step 550, process 500 performs a secondary test on the selected portion of data in step 550. In some embodiments, the test may use the method described in the Blum patent to compare the audio portion of a work with the audio portions of the identified works.

If there is not a match in the secondary test, process 500 performs step 340 and tries to find another match, as the identity could not be confirmed. If there is a match between the identified work and the unknown work in step 450 the unknown work is reported as identified as the known work in step 565. In step 570, process 500 determines whether the newly identified work is an authorized copy. This may be done in any number of manners depending on how the data for the work was received. For example if the data was read from packets, the source and destination addresses may be used. The mode of delivery may also be used or any other number of methods may be used. If it is determined that the work is an authorized copy, process 500 ends. Otherwise, a report of the unauthorized copy is reported in step 575 and in an optional step 580 a business rule may be applied to the unauthorized copy. Some examples of actions that may be taken include erasing the work from the memory, blocking transmission of packets carrying the data, and degrading the data to make the unauthorized copy unusable. Process 500 then ends.

Figure 6A:
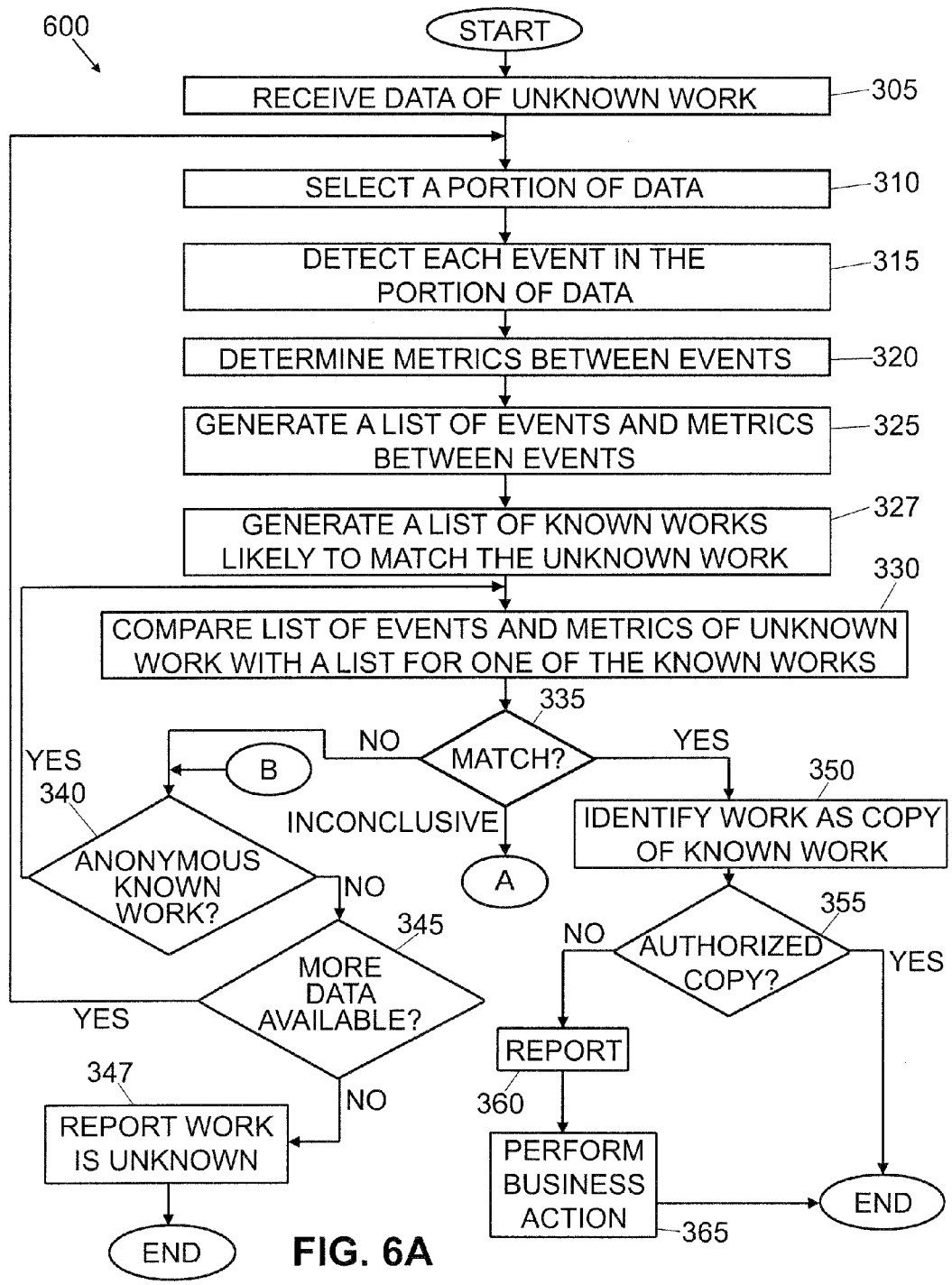
FIGS. 6A and 6B illustrating a block diagram of a first exemplary embodiment of an identification process in accordance with this invention.
Figure 6B:
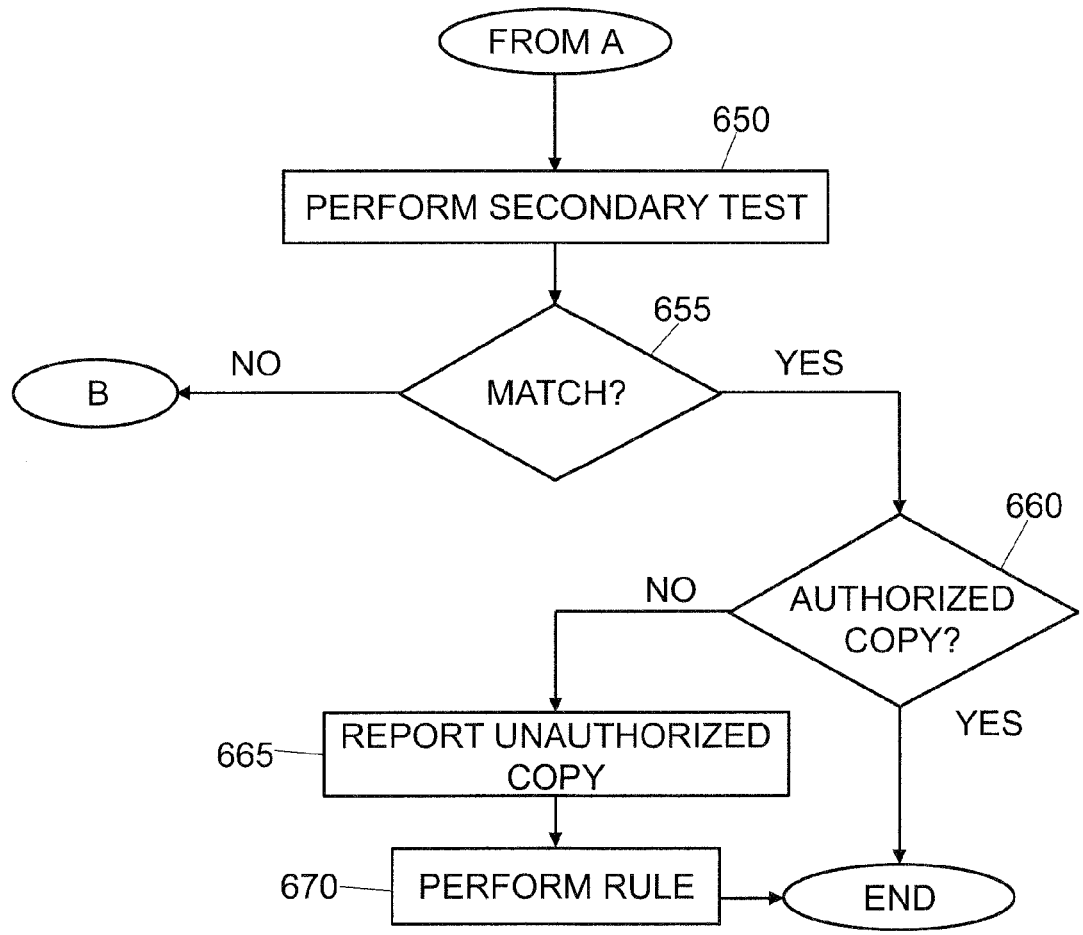

FIG. 6 illustrates a fourth exemplary process 600. Process 600 provides a secondary test when the matching with an identified work in step 335 is inconclusive. An inconclusive result can happen for a number of reasons. For example, the number of elements in the unknown list of events and metrics may not be enough to say with high likelihood that a match has been made. As another example, there may also be several known reference lists that match the unknown lists and we may need an additional test to distinguish between them. Process 600 has the following additional steps when a test is inconclusive in step 335.

In response to inconclusive results process 600 performs a secondary test on the selected portion of data and the identified work in question in step 650. In some embodiments, the test may be using the method described in the Blum patent to compare the audio portion of a work with the audio portions of the identified works.

If there is no match in the secondary test, process 600 repeats the process from step 345 as described above. If there is a match between the identified work and the unknown work in step 650 the unknown work is reported as identified as the known work in step 655. In step 660, process 600 determines whether the newly identified work is an authorized copy. This may be done by any number of methods depending on how the data for the work was received. For example if the data was read from packets, the source and destination addresses may be used. The mode of delivery may also be used or any other number of methods may be used. If it is determined that the work is an authorized copy, process 600 ends. Otherwise, a report of the unauthorized copy is reported in step 665 and in an optional step 670 a business rule may be applied to the unauthorized copy. Some examples of actions that may be taken include erasing the work from the memory, blocking transmission of packets carrying the data, and degrading the data to make the unauthorized copy unusable. Process 600 then ends.

FIGS. 7-11 are exemplary embodiments of a process for comparing the list of events and metrics of an unknown work against the list of events and metrics of a known work. These figures taken together correspond to step 330 in FIGS. 3-6.

Figure 7:
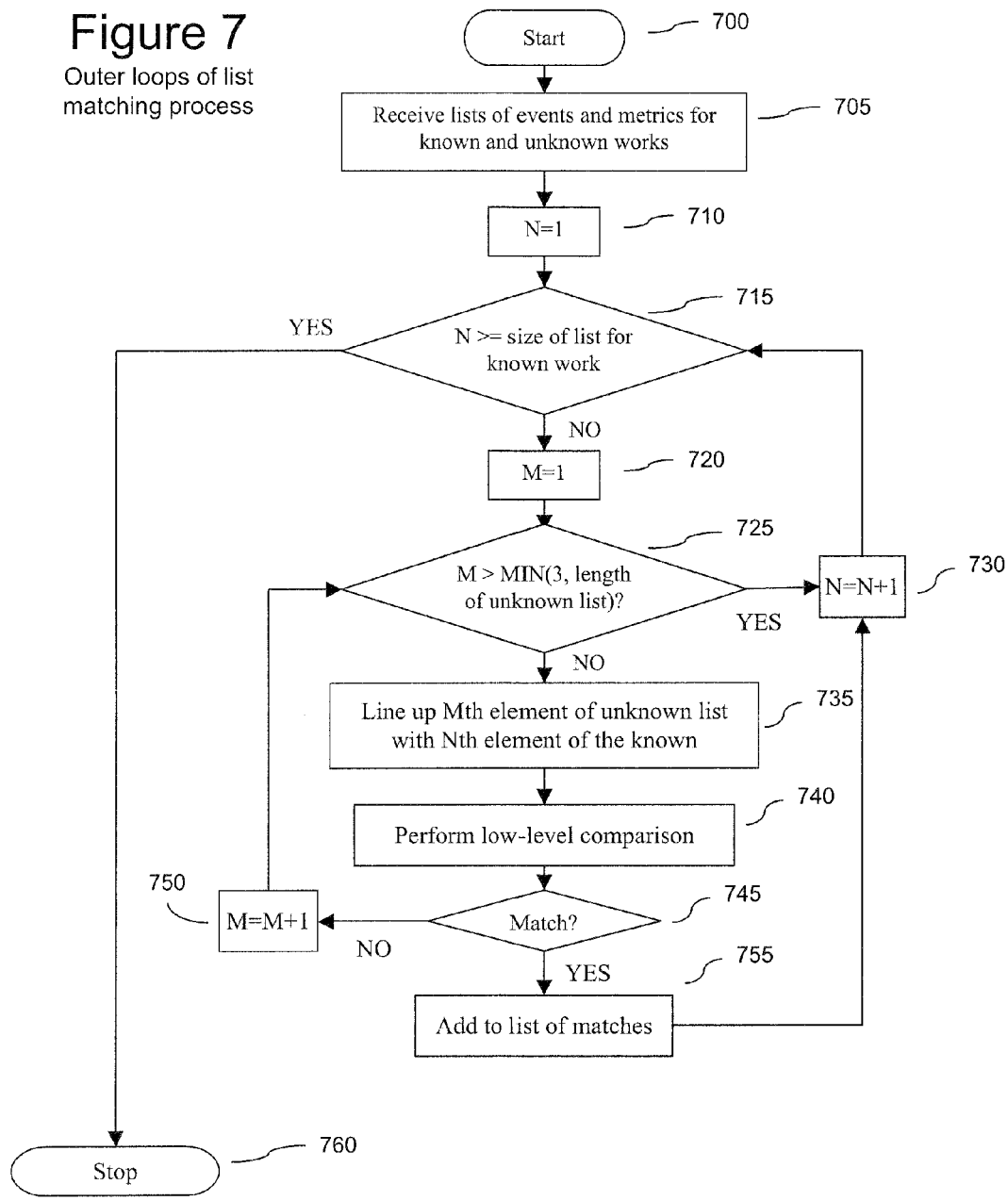
FIGS. 7-9 illustrating a block diagram of a first exemplary embodiment of a process for comparing a list of events and metrics from an unknown work with a list of events and metrics of known work in accordance with this invention.

FIG. 7 shows the outer loops of recursive process 700. Process 700 begins in step 705. In step 705, process 700 receives lists of events and metrics for a known work and an unknown work. In a typical embodiment in a video matching application, each list includes the time locations of scene changes of the video and other metrics such as the strength of the scene change, e.g., the average frame-to-frame pixel difference normalized by the average luminance of the neighboring frames. In step 710, process 700 sets an integer index variable N to 1 to initialize a recursive loop. N is an index over the events and metrics in the list of the known and unknown works. The outer loop, indexed by N, is used to align and test the matching of the unknown at each of the event locations in the known reference. The loop begins in step 715. In step 715, process 700 determines whether N is greater than or equal to the length of the list for the known work. If N is greater than the list length, process 700 proceeds to step 760 and ends. If N is not greater than or equal to the length of the list for the known work, process 700 proceeds to step 720. In step 720, the process sets a second integer index variable, M to 1. This second integer index variable is an index over the first few elements of the list of events and metrics for the unknown work. The inner loop determines whether the first event in the unknown list has a corresponding matching event in the known list. If the first event does not have a match in the known list, a match may not be detected even in a case where all the following events in the unknown matched events and metrics in the known work match perfectly.

In process 700, step 725 tests the index M against the minimum of 3 and the length of the unknown list. The inner loop of process 700 tests the basic matching algorithm by aligning each of the first 3 events in the unknown list with event N in the known list. Anyone skilled in the art will realize that a more exhaustive search can be conducted by raising the constant in step 725. If M is greater than this minimum, process 700 increments the outer index N in step 730 and repeats process 700 from step 715.

Figure 8:
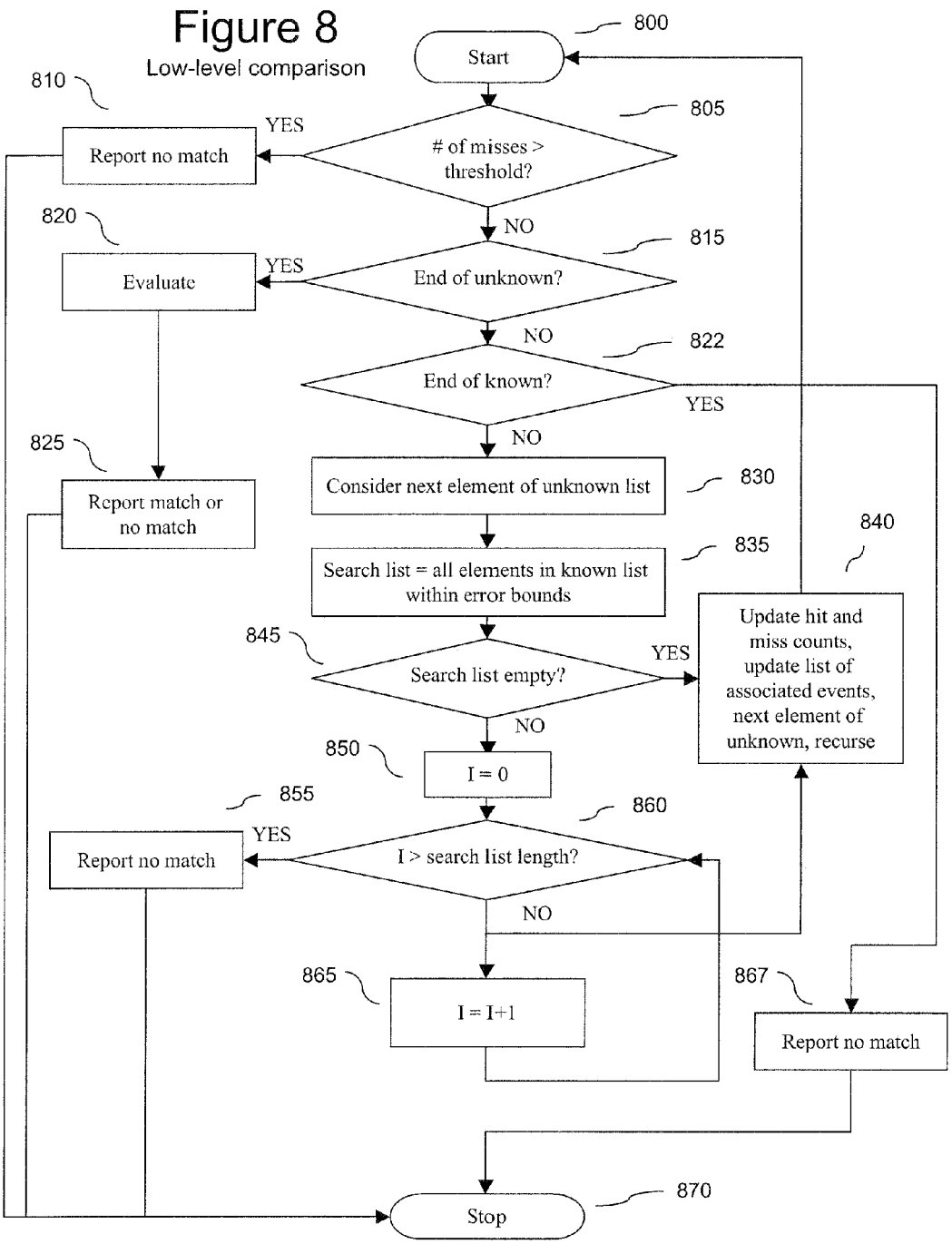
Figure 9:
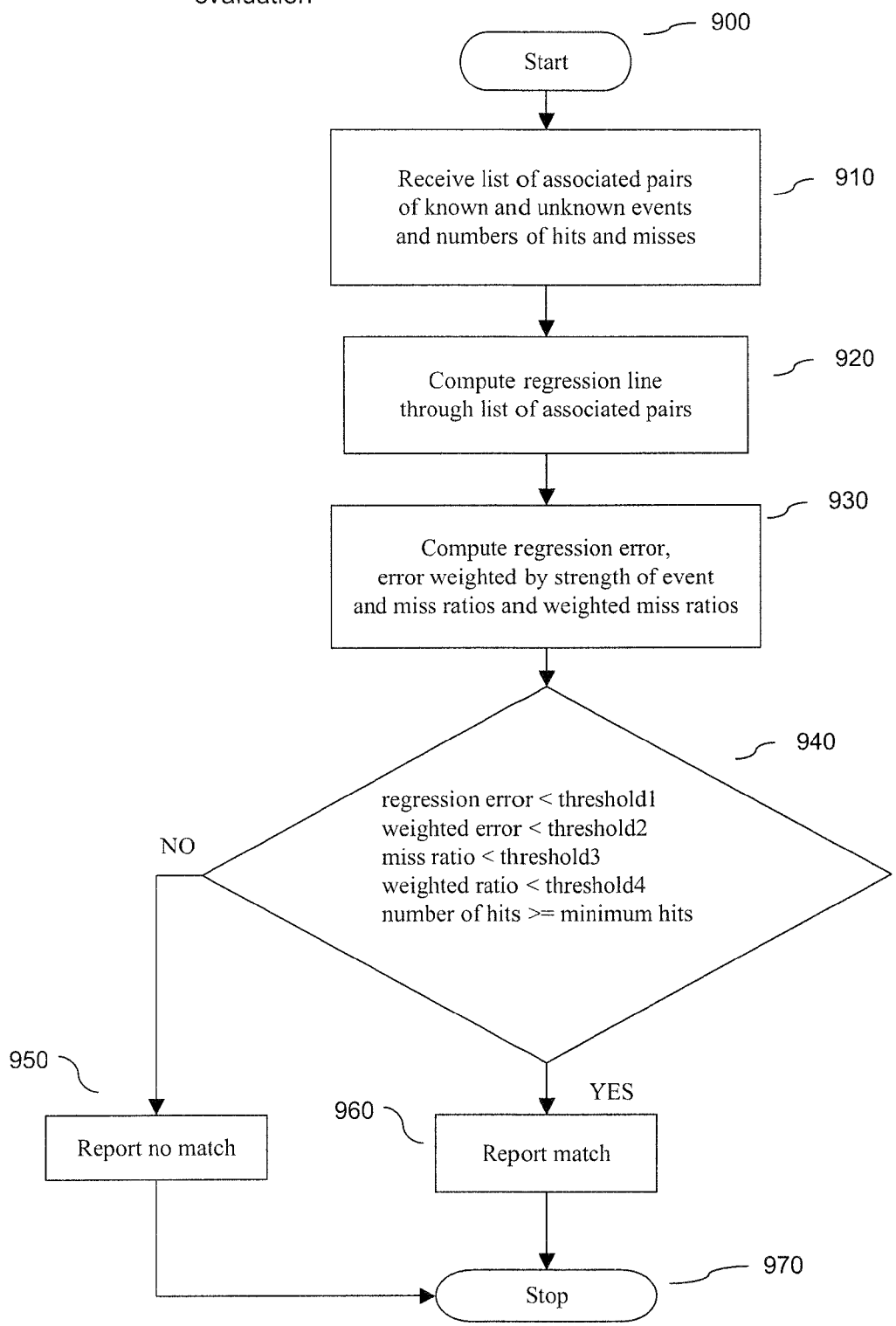

If the test fails, process 700 proceeds to step 735, where the Mth element of the unknown work list is aligned with the Nth element of the known work list. In step 740, process 700 performs a low-level comparison to detect a match between the Mth element of the unknown work list aligned with the Nth element of the known work list. FIGS. 8 and 9 show a process for the comparison test of step 740. Process 700 enters step 740 with a) a list of events and metrics from the unknown work list starting at event M and continuing to the end of the list of events and metrics in the unknown; b) a list of events and metrics from the known work list starting at event N and continuing to the end of the list of events and metrics in the known; c) the number of hits set to 1; and d) the number of misses set to 0. At 745 we test the results of 740. If there is no match reported, process 700 increments M in step 750 and return to the top of the inner loop at 725. If there is a match reported, process 700 adds this match to the list of matches and increments N at 730 and proceeds to repeat process 700 from step 715. In an alternate embodiment, process 700 will return after the first match rather than look for all possible matches.

FIG. 8 shows an exemplary embodiment of the low-level comparison process 800 which performs a low level comparison for step 740. At the beginning of the process 800, process 800 aligns one of the events in the unknown list with an event in the known reference list. Process 800 measures how well the following events and metrics in the two lists correspond. A high degree of correspondence will result in a match being reported and a low degree of correspondence will result in a report of no match. In the following description, a low-level "miss" occurs when there is either no event in the known list corresponding to a particular event in the unknown list or there is no event in the unknown list corresponding to a particular event in the known reference list. A low-level "hit" occurs when there is a correspondence between an element in the known reference list and an event in the unknown list. The process shown in FIG. 8 is a recursive process. Process 800 causes another recursion of process 800 from various locations inside process 800, and a reported match or no match deep inside the recursion will be returned up to the top of the recursion.

Process 800 begins in step 805 by comparing a number of total misses so far against a miss threshold. The miss threshold typically is a relative threshold, for example, a percentage of the total number of events that have been examined by process 800. The first time process 800 enters the recursive process the number of misses is 0. If the miss threshold is exceeded by the number of misses, step 810 returns an indication of no match and returns to the next recursion of the process. If the threshold is not exceeded, process 800 performs step 815.

In step 815, process 800 determines if the end of the unknown list has been reached in the current recursion of process 800. If the end of the unknown list has been reached, process 800 performs an evaluation step 820 and reports the result of the evaluation in step 825 and returns. This evaluation step will be described more in the following figures. In a typical embodiment, evaluation 820 uses the number of misses, the number of hits, some scoring or error measure of the hits, and a weighting of hits and misses and error based on the other metrics of the events, e.g., how strong of an event it is.

In step 822, process 800 determines whether the end of the known list has been reached. If the end of known list has been reached process 800 returns no match in step 867 and returns to the prior recursion of process 800 in step 870.

If this recursion of process 800 has not reached the end of the unknown list, process 800 considers the next element of the unknown list in step 830. Process 800 generates a search list of elements in the known list in step 835. The construction of the error bound is shown in more detail in FIGS. 10 and 11. The search list contains all the events in the known reference list that are within a certain distance of the current event in the aligned unknown.

Step 845 determines if the search list is empty. If the search list is empty, process 800 updates the number of misses. For purposes of this disclosure, an empty search list has no events in the unknown list that are close in metrics to the current event in the known list. Process 800 updates the number of misses in the known miss total and adds one to the number of misses in the unknown miss total; updates a list showing all the correspondences of events so far; moves an index to the next element in the unknown; and calls for a recursion of process 800 from the current element of the unknown list. The number of misses in the known miss total is incremented by the number of events in the known event list that are skipped over before the next event in the known list is found that is associated with the said unknown element.

If the search list is not empty, step 850 sets a third index integer, I, to 0. In step 860, process 800 determines whether I is greater than the length of the search list. If not, process 800 increments the third index integer variable in step 865 and step 860 is repeated. Steps 850-865 associate the next element in the unknown list considered in step 830 with each element of the search list, and call the process in 800 recursively for each iteration of I. Each recursive call has to keep track of all past associations of unknown events and known reference events as well as current miss and hit counts so that the tests in 805 and 820 can be applied.

At some point in the recursive calling sequence, process 800 reaches the end of the unknown list in step 815 and the current recursion ends. Each recursion of process 800 returns until a match or no match is reported to the test in step 745 of FIG. 7.

FIG. 9 is an exemplary process 900 for performing the evaluation step 820 of process 800 shown in FIG. 8. In a typical embodiment, process 900 takes into account the number of misses, the number of hits, some scoring or error measure of the hits, and a weighting of hits and misses and error based on the other metrics of the events, e.g., the strength of an event. At this point the process is at the end of the unknown and will make a final decision as to whether the candidate list of associations of events in the unknown and events in the known reference are indicative of a match. Process 900 begins in step 910 by receiving the list of associated pairs of events in the unknown list and events in the known list as well as the accumulated number of hits and misses. In step 920, process 900 computes a regression line through the set of points (x,y) where each x is the time location of an element of the unknown list which has an associated element in the unknown list and y is the time location of said associated known list element. The regression line can be computed by standard linear regression techniques well known in the art.

After the regression line is computed, process 900 computes a regression error in 930. In step 930, process 900 computes an unweighted regression error and a regression error weighted by the strength of the event from the unknown list or other metrics associated with the event. In an exemplary embodiment, the regression error will be computed by taking the average of the absolute error between the timing of each event in the unknown list and the timing of the associated event in the known list. The timing of the unknown event has to be measured relative to the first event in the unknown list and the timing of the event from the known list has to be measured relative to the known event associated with the first event in the unknown list. The timing of the known events has to be corrected by the slope and offset of the regression line. The weighted regression error is computed in the same manner: a weighted average is computed, where the weight at each step is the strength of the event or another metric associated with the event. Also in step 930, process 900 computes the ratios of misses to the sum of the number of hits and misses in both a weighted and unweighted version, where the weights are the strength of the event or another metric associated with the event.

In step 940, process 900 tests each of these errors and ratios against an associated threshold to determine if the match is within the error limits. In an exemplary embodiment threshold1, a regression error limit, is set to 0.05; threshold2, a weighted regression error limit, is set to 0.04; threshold3, a miss ratio limit, is 0.3; and threshold4, a weighted ratio limit, is 0.25. Furthermore, in step 930, process 900 also compares the total number of hits to a minimum number of hits to avoid degenerate cases. In an exemplary embodiment, the minimum number of hits is set to 10. Based on this test, process 900 either reports a match in 960 or reports no match in 950 and process 900 returns to the recursion in step 970.

Figure 10:
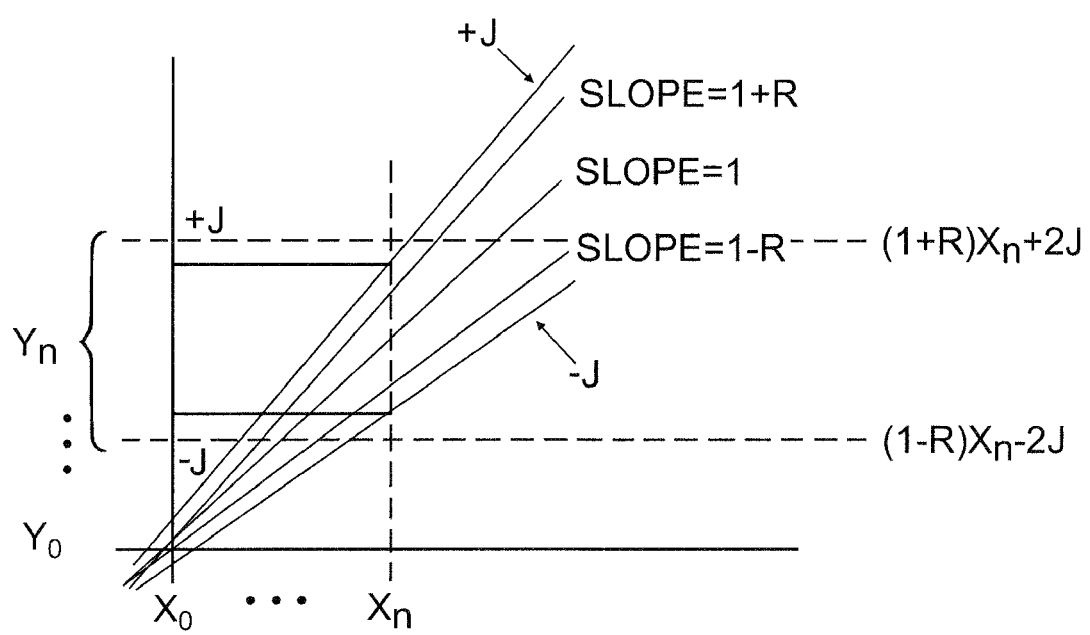
FIGS. 10 and 11 illustrating an exemplary embodiment of a method for constructing an error bound in the comparison of the events and metrics of an unknown work with the events and metrics of a known work in accordance with this invention.
Figure 11:
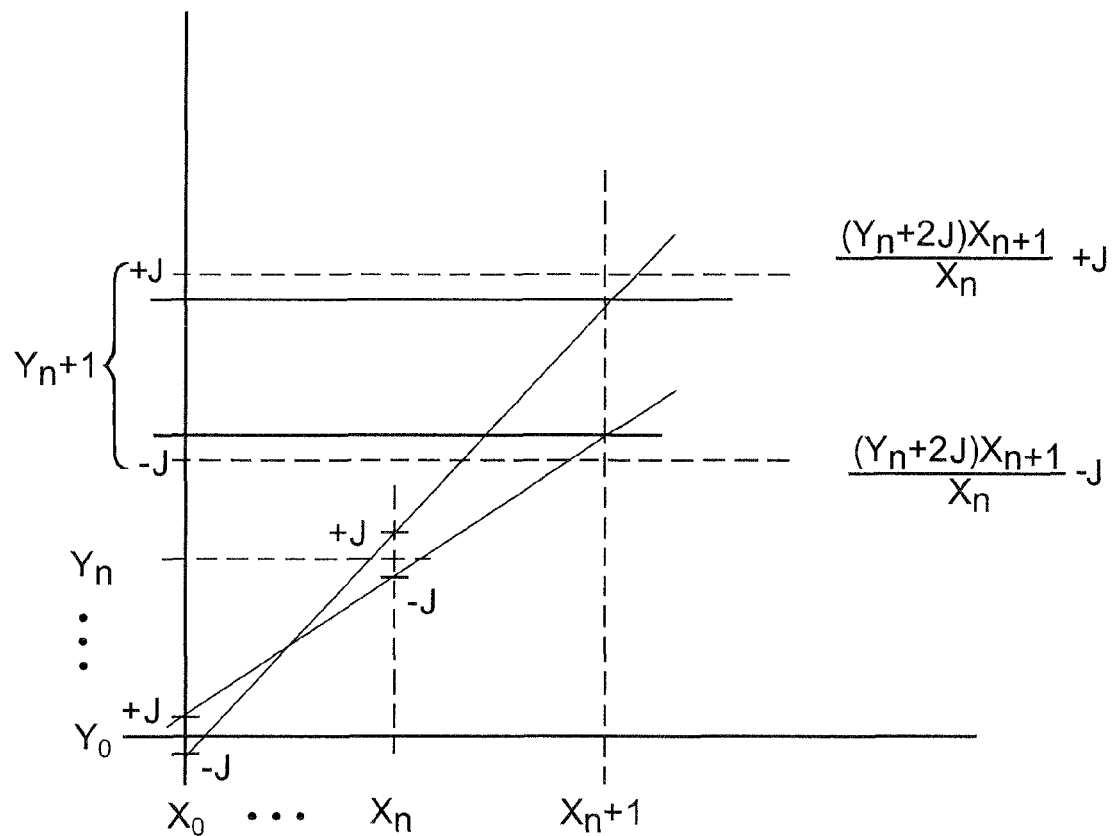

FIGS. 10 and 11 show an exemplary method for setting the error bounds in step 835 in FIG. 8. FIG. 10 shows how the bound is calculated the first time through step 835 and FIG. 11 shows a tighter bound that can be applied for later iterations. In FIG. 10, the x axis holds the event locations of the unknown and the y axis holds the event locations of the reference signature. Without loss of generality, the FIG. 10 shows the x(0),y(0) pair at the origin for convenience. This is the location of the test alignment between the two lists resulting from step 735. If the two lists were identical at this point, the associated x,y pairs that follow would all lie along the line x=y with a slope of 1. However, the fact that the playback rate can be off by an amount R means that the points can fall within a cone from a slope of 1−R to a slope of 1+R. In an exemplary embodiment, R is set to 5% (0.05) which covers typical rate changes in video due to NTSC to PAL conversion, for example. In addition, process 900 may allow for a "jitter error" J on the alignment between corresponding points due to errors caused for example by frame rate changes and scene change detection. In an exemplary embodiment, J is set to 0.1 seconds, which covers typical frame rate changes in video on the Internet, for example. That is, the initial x(0),y(0) pair can be off by +−J, which is shown by the red sloping lines above and below the cone. In addition, the final x(n),y(n) pair can be off by +−J, which is shown by the +−J bars along the y axis. The final error bounds are shown on the right, from ((1−R)x(n)−2J) to ((1+R)x(n)+2J). The search list in 835 will consist of all the elements in the known reference list whose event timings fall between these bounds.

FIG. 11 shows that once at least a pair of associated events are found, previous associations of event timings constrain the possibilities for new associations events further along the known and unknown lists. In this case, process 800 proceeded far enough such that a list of associated points from x(0),y(0) to x(n),y(n) have been tested and process 800 is now searching for a possible match with the timing x(n+1) of the next element in the unknown list.

Both the beginning and ending pairs can be misaligned by +/−J, which gives two worst-case lines, one from the maximum positive misalignment of the first pair through the maximum negative misalignment of the last pair and the other from the maximum negative misalignment of the first pair through the maximum positive misalignment of the last pair. Process 800 also allows for a +−J misalignment error at the final choice of y(n+1). This gives the bounds on the right, from ((y(n)−2J)x(n+1)/x(n)−J) to ((y(n)+2J)x(n+1)/x(n)+J). The search list in 835 now includes all the elements in the known reference list whose event timings fall between the tighter of these bounds and the bounds determined by the calculation shown in FIG. 10.

Referring back to FIG. 7, the outer loop of process 700 surrounded by steps 710, 715 and 730 of FIG. 7 exemplifies a 'brute force' search where every possible alignment of the unknown reference list against the known reference list is tested. In general, a brute force method is inefficient. Thus, various methods can be used to index the list of the known work to speed up the search process. In a typical embodiment of this invention, a database contains all the known reference lists for all the target videos or media files of interest. Before any unknown videos or files are processed, the database is indexed to speed up the search. As an example, each event in the event list for each known work would be associated with the time duration between said event timing and the timing of the next event in the said list. A sorted list of all the durations for all the events in all the event lists for all the known references would be stored using any sorting technique well known in the art. Each of these durations would have an associated pointer referring back to the events associated with the duration.

When such a list for an unknown work is passed to search process 700, the outer loop is not required and may be removed. FIG. 12 illustrates a process that is the equivalent of process 700 using this index. Most of process 1200 is similar to process 700, except that the outer loop of 700 has been removed and replaced by a new inner loop that uses the index to choose particular locations in the known reference list instead of brute force searching over all locations in the said list.

In step 1220, process 1200 computes the duration between the Mth event in the unknown list and M+1th event in the unknown list. Using any sorted list search technique such as binary search or hash search, process 1200 generates a list of events in the known reference list in step 1225 which have durations close to the duration computed in step 1220. For purposes of this discussion, 'close to' means durations within an error bound determined by the expected jitter error J and the playback rate error R.

The inner loop specified by steps 1230, 1235 and 1245 iterates over all the elements in this search list. The low-level comparison in step 1225 is exactly the same as that in step 740 of FIG. 7. One skilled in the art will recognize that other attributes of the list of events and metrics could be used to limit the search to those Mth events that are most likely to match. Some examples include using strength of an event within some tolerance, the absolute value of the measured signal slightly before or slightly after the event, or, if the signal is multidimensional, then some distribution of the signal slightly before or after the event could be used.

The above is a description of various embodiments in accordance with this invention. It is anticipated that those skilled in the art can and will design alternative systems that infringe on this invention as set forth in the following claims either literally or through the Doctrine of Equivalents.

What is claimed is:

1. A method for identifying a work in a digital processing system comprising:
    selecting, by a processor, a portion of data of an unknown work;
    detecting each event in said portion of data of said unknown work;
    determining a metric between each successive event in said portion of data in said unknown work;
    generating a list of metrics between said events for said unknown work;
    comparing said list of metrics for said unknown work to a list of metrics for a known work, wherein the comparing comprises
        receiving said list of metrics of said unknown work and said list of metrics of said known work,
        determining a number of events in said list of metrics for said unknown work that match events in said list of metrics for said known work by
            receiving said list of metrics for said unknown work starting at the Mth element,
            receiving said list of metrics of said known work starting at the Nth element, generating a list of associated pairs wherein each M+X element of said list of metrics for said unknown work is paired with the N+X element of said list of metrics for said known work, computing a regression line through said associated pair in said list of associated pairs, determining a weighted error from said computation of said regression line, comparing said weighted error to a weighted error threshold, and determining a match between said lists responsive to said weighted error being less than said weighted error threshold, determining whether said number at least equals a threshold, and returning a match responsive to said number being at least equal to said threshold; and determining said unknown work is a copy of said known work responsive to a match between said list of metrics of said unknown work and said list of metrics for said known work.

2. The method of claim 1 further comprising:
comparing said list of metrics of said unknown work to a plurality of lists of metrics wherein each list of metrics is for a known work responsive to a determination that said list of metrics of said unknown work did not match said list of metrics of said known work;

determining said unknown work is a copy of one of said known works responsive to a match of said list of metrics of said unknown work and said one of said plurality of lists that represents said one of said known works.

3. The method of claim 2 further comprising:
generating a group of said plurality of lists of metrics from known works that are likely to match said unknown work.

4. The method of claim 1 further comprising:
receiving a segment of data of said unknown work; and
selecting said portion of data from said segment of data received.

5. The method of claim 4 wherein said step of receiving said segment of data comprises:
reading said segment of data from memory.

6. The method of claim 4 wherein said step of receiving said segment of data comprises:
receiving packets over a network wherein each packet includes a portion of said segment of data;
extracting said portion of said segment of data from each of said packets; and
reassembling said segment of data from said packets.

7. The method of claim 4 wherein said step of receiving said segment of data comprises:
reading said segment of data from a media storing said segment of data.

8. The method of claim 1 further comprising:
determining whether said unknown work is an authorized copy of said known work responsive to a determination that said unknown work is a copy of said known work.

9. The method of claim 8 further comprising:
performing a business rule in response to a determination that said unknown work is an unauthorized copy.

10. The method of claim 1 further comprising:
reporting said unknown work is an unauthorized copy responsive to a determination that said unknown work is an unauthorized copy of said known work.

11. The method of claim 1 further comprising:
performing a secondary test responsive to a determination that said list of said unknown work does match said list of said known work.

12. The method of claim 1 further comprising;
performing a secondary test responsive to a determination that said comparison between said list of said unknown work and said list of said known work are inconclusive.

13. The method of claim 1 further comprising:
performing a secondary test to verify an identity of said unknown work responsive to a determination that said list of said unknown work matches said known work.

14. The method of claim 1 wherein determining said number comprises:
aligning an Mth element of said list of metrics of said unknown work with an Nth element of said list of metrics for said known work;

performing a first comparison of said lists starting from said Mth element in said list of metrics for said unknown list and said Nth element in said list of metrics for said known work;

determining whether said lists from said Mth element and said Nth element match; and determining a match responsive to a determination said lists match.

15. The method of claim 1 further comprising:
recursively determining whether elements of said list of metrics for said unknown work match elements of said list of metrics for said known work.

16. The method of claim 1 wherein said step for determining a match between said list of metrics for said unknown work and said list of metrics for said known work further comprises:
determining a match when a number of hits surpasses a threshold.

17. The method of claim 1 wherein said step for determining a match between said list of metrics for said unknown work and said list of metrics for said known work further comprises:
determining there is no match responsive to a number of misses being greater than a second threshold.

18. The method of claim 1 wherein said step for determining a match between said list of metrics for said unknown work and said list of metrics for said known work further comprises:
computing an error tolerance from said regression line.

19. The method of claim 1 wherein said step for determining a match between said list of metrics for said unknown work and said list of metrics for said known work further comprises:
determining a regression error from said computation of said regression line;

comparing said regression error to a regression error threshold; and determining a match between said lists responsive to said regression error being less than said regression error threshold.

20. A method for identifying a work in a digital processing system comprising:
selecting, by a processor, a portion of data of an unknown work;

detecting each event in said portion of data of said unknown work;

determining a metric between each successive event in said portion of data in said unknown work;

generating a list of metrics between said events for said unknown work;

comparing said list of metrics for said unknown work to a list of metrics for a known work, wherein the comparing comprises:
  receiving said list of metrics of said unknown work and said list of metrics of said known work,
  determining a number of events in said list of metrics for said unknown work that match events in said list of metrics for said known work, wherein determining the number of events comprises:
    receiving said list of metrics for said unknown work starting at the Mth element,
    receiving said list of metrics of said known work starting at the Nth element,
    generating a list of associated pairs wherein each M+X element of said list of metrics for said unknown work is paired with the N+X element of said list of metrics for said known work,
    computing a regression line through said associated pair in said list of associated pairs,
    determining a miss ratio from said computation of said regression line,
    comparing said miss ratio to a miss ratio threshold, and
    determining a match between said lists responsive to said miss ratio being less than said miss ratio threshold,
  determining whether said number at least equals a threshold, and
  returning a match responsive to said number being at least equal to said threshold; and
  determining said unknown work is a copy of said known work responsive to a match between said list of metrics of said unknown work and said list of metrics for said known work.

21. A method for identifying a work in a digital processing system comprising:
  selecting, by a processor, a portion of data of an unknown work;
  detecting each event in said portion of data of said unknown work;
  determining a metric between each successive event in said portion of data in said unknown work;
  generating a list of metrics between said events for said unknown work;
  comparing said list of metrics for said unknown work to a list of metrics for a known work, wherein the comparing comprises:
    receiving said list of metrics of said unknown work and said list of metrics of said known work,
    determining a number of events in said list of metrics for said unknown work that match events in said list of metrics for said known work, wherein determining the number of events comprises:
      receiving said list of metrics for said unknown work starting at the Mth element,
      receiving said list of metrics of said known work starting at the Nth element,
      generating a list of associated pairs wherein each M+X element of said list of metrics for said unknown work is paired with the N+X element of said list of metrics for said known work,
      computing a regression line through said associated pair in said list of associated pairs,
      determining a weighted miss ratio from said computation of said regression line;
      comparing said weighted miss ratio to a weighted miss ratio threshold; and
    determining a match between said lists responsive to said weighted miss ratio being less than said weighted miss ratio threshold,
    determining whether said number at least equals a threshold, and
    returning a match responsive to said number being at least equal to said threshold; and
  determining said unknown work is a copy of said known work responsive to a match between said list of metrics of said unknown work and said list of metrics for said known work.

22. A non-transitory computer readable storage medium that provides instructions for identifying a work in a digital processing system, the instructions when executed by a processing unit, cause the processing unit to:
  select a portion of data of an unknown work;
  detect each event in said portion of data of said unknown work;
  determine a metric between each successive event in said portion of data in said unknown work;
  generate a list of metrics between said events for said unknown work;
  compare said list of metrics for said unknown work to a list of metrics for a known work, wherein to compare said list of metrics for said unknown work to a list of metrics for a known work comprises
    receiving said list of metrics of said unknown work and said list of metrics of said known work,
    determining a number of events in said list of metrics for said unknown work that match events in said list of metrics for said known work by
      receiving said list of metrics for said unknown work starting at the Mth element,
      receiving said list of metrics of said known work starting at the Nth element,
      generating a list of associated pairs wherein each M+X element of said list of metrics for said unknown work is paired with the N+X element of said list of metrics for said known work,
      computing a regression line through said associated pair in said list of associated pairs,
      determining a weighted error from said computation of said regression line,
      comparing said weighted error to a weighted error threshold, and
      determining a match between said lists responsive to said weighted error being less than said weighted error threshold,
    determining whether said number at least equals a threshold, and
    returning a match responsive to said number being at least equal to said threshold; and
  determine said unknown work is a copy of said known work responsive to a match between said list of metrics of said unknown work and said list of metrics for said known work.

23. The non-transitory computer readable storage medium of claim 22, wherein said instructions further cause the processing unit to:
  compare said list of metrics of said unknown work to a plurality of lists of metrics wherein each list of metrics is for a known work responsive to a determination that said list of metrics of said unknown work did not match said list of metrics of said known work; and
  determine said unknown work is a copy of one of said known works responsive to a match of said list of metrics of said unknown work and said one of said plurality of lists that represents said one of said known works.

24. The non-transitory computer readable storage medium of claim 22, wherein said instructions cause the processing unit to determine said number by:
   aligning an Mth element of said list of metrics of said unknown work with an Nth element of said list of metrics for said known work;
   performing a first comparison of said lists starting from said Mth element in said list of metrics for said unknown list and said Nth element in said list of metrics for said known work;
   determining whether said lists from said Mth element and said Nth element match; and
   determining a match responsive to a determination said lists match.

25. The non-transitory computer readable storage medium of claim 22, wherein said instructions further cause the processing unit to:
   recursively determine whether elements of said list of metrics for said unknown work match elements of said list of metrics for said known work.

26. A non-transitory computer readable storage medium that provides instructions for identifying a work in a digital processing system, the instructions when executed by a processing unit, cause the processing unit to:
   select a portion of data of an unknown work;
   detect each event in said portion of data of said unknown work;
   determine a metric between each successive event in said portion of data in said unknown work;
   generate a list of metrics between said events for said unknown work;
   compare said list of metrics for said unknown work to a list of metrics for a known work, wherein to compare said list of metrics for said unknown work to a list of metrics for a known work comprises
      receiving said list of metrics of said unknown work and said list of metrics of said known work,
      determining a number of events in said list of metrics for said unknown work that match events in said list of metrics for said known work, wherein determining the number of events comprises
         receiving said list of metrics for said unknown work starting at the Mth element,
         receiving said list of metrics of said known work starting at the Nth element,
         generating a list of associated pairs wherein each M+X element of said list of metrics for said unknown work is paired with the N+X element of said list of metrics for said known work,
         computing a regression line through said associated pair in said list of associated pairs,
         determining a miss ratio from said computation of said regression line,
         comparing said miss ratio to a miss ratio threshold, and
         determining a match between said lists responsive to said miss ratio being less than said miss ratio threshold,
      determining whether said number at least equals a threshold, and
      returning a match responsive to said number being at least equal to said threshold; and
   determine said unknown work is a copy of said known work responsive to a match between said list of metrics of said unknown work and said list of metrics for said known work.

27. The non-transitory computer readable storage medium of claim 26, wherein said instructions further cause the processing unit to:
   compare said list of metrics of said unknown work to a plurality of lists of metrics wherein each list of metrics is for a known work responsive to a determination that said list of metrics of said unknown work did not match said list of metrics of said known work; and
   determine said unknown work is a copy of one of said known works responsive to a match of said list of metrics of said unknown work and said one of said plurality of lists that represents said one of said known works.

28. The non-transitory computer readable storage medium of claim 26, wherein said instructions cause the processing unit to determine said number by:
   aligning an Mth element of said list of metrics of said unknown work with an Nth element of said list of metrics for said known work;
   performing a first comparison of said lists starting from said Mth element in said list of metrics for said unknown list and said Nth element in said list of metrics for said known work;
   determining whether said lists from said Mth element and said Nth element match; and
   determining a match responsive to a determination said lists match.

29. The non-transitory computer readable storage medium of claim 26, wherein said instructions further cause the processing unit to:
   recursively determine whether elements of said list of metrics for said unknown work match elements of said list of metrics for said known work.

30. A non-transitory computer readable storage medium that provides instructions for identifying a work in a digital processing system, the instructions when executed by a processing unit, cause the processing unit to:
   select a portion of data of an unknown work;
   detect each event in said portion of data of said unknown work;
   determine a metric between each successive event in said portion of data in said unknown work;
   generate a list of metrics between said events for said unknown work;
   compare said list of metrics for said unknown work to a list of metrics for a known work, wherein to compare said list of metrics for said unknown work to a list of metrics for a known work comprises
      receiving said list of metrics of said unknown work and said list of metrics of said known work,
      determining a number of events in said list of metrics for said unknown work that match events in said list of metrics for said known work, wherein determining the number of events comprises
         receiving said list of metrics for said unknown work starting at the Mth element,
         receiving said list of metrics of said known work starting at the Nth element,
         generating a list of associated pairs wherein each M+X element of said list of metrics for said unknown work is paired with the N+X element of said list of metrics for said known work,
         computing a regression line through said associated pair in said list of associated pairs, determining a weighted miss ratio from said computation of said regression line, comparing said weighted miss ratio to a weighted miss ratio threshold, and determining a match between said lists responsive to said weighted miss ratio being less than said weighted miss ratio threshold, determining whether said number at least equals a threshold, and returning a match responsive to said number being at least equal to said threshold; and determine said unknown work is a copy of said known work responsive to a match between said list of metrics of said unknown work and said list of metrics for said known work.

31. The non-transitory computer readable storage medium of claim 30, wherein said instructions further cause the processing unit to:

compare said list of metrics of said unknown work to a plurality of lists of metrics wherein each list of metrics is for a known work responsive to a determination that said list of metrics of said unknown work did not match said list of metrics of said known work; and determine said unknown work is a copy of one of said known works responsive to a match of said list of metrics of said unknown work and said one of said plurality of lists that represents said one of said known works.

32. The non-transitory computer readable storage medium of claim 30, wherein said instructions cause the processing unit to determine said number by:

aligning an Mth element of said list of metrics of said unknown work with an Nth element of said list of metrics for said known work;

performing a first comparison of said lists starting from said Mth element in said list of metrics for said unknown list and said Nth element in said list of metrics for said known work;

determining whether said lists from said Mth element and said Nth element match; and determining a match responsive to a determination said lists match.

33. The non-transitory computer readable storage medium of claim 30, wherein said instructions further cause the processing unit to:

recursively determine whether elements of said list of metrics for said unknown work match elements of said list of metrics for said known work.

34. An apparatus for identifying a work in a digital processing system, comprising:

means for selecting a portion of data of an unknown work;

means for detecting each event in said portion of data of said unknown work;

means for determining a metric between each successive event in said portion of data in said unknown work;

means for generating a list of metrics between said events for said unknown work;

means for comparing said list of metrics for said unknown work to a list of metrics for a known work, wherein the means for comparing comprises means for receiving said list of metrics of said unknown work and said list of metrics of said known work, means for determining a number of events in said list of metrics for said unknown work that match events in said list of metrics for said known work, wherein the means for determining the number of events comprises means for receiving said list of metrics for said unknown work starting at the Mth element, means for receiving said list of metrics of said known work starting at the Nth element, means for generating a list of associated pairs wherein each M+X element of said list of metrics for said unknown work is paired with the N+X element of said list of metrics for said known work, means for computing a regression line through said associated pair in said list of associated pairs, means for determining a weighted error from said computation of said regression line, means for comparing said weighted error to a weighted error threshold, and means for determining a match between said lists responsive to said weighted error being less than said weighted error threshold, means for determining whether said number at least equals a threshold, and means for returning a match responsive to said number being at least equal to said threshold; and means for determining said unknown work is a copy of said known work responsive to a match between said list of metrics of said unknown work and said list of metrics for said known work.

35. The apparatus of claim 34, further comprising:

means for comparing said list of metrics of said unknown work to a plurality of lists of metrics wherein each list of metrics is for a known work responsive to a determination that said list of metrics of said unknown work did not match said list of metrics of said known work; and means for determining said unknown work is a copy of one of said known works responsive to a match of said list of metrics of said unknown work and said one of said plurality of lists that represents said one of said known works.

36. The apparatus of claim 34, wherein said means for determining said number comprises:

means for aligning an Mth element of said list of metrics of said unknown work with an Nth element of said list of metrics for said known work;

means for performing a first comparison of said lists starting from said Mth element in said list of metrics for said unknown list and said Nth element in said list of metrics for said known work;

means for determining whether said lists from said Mth element and said Nth element match; and means for determining a match responsive to a determination said lists match.

37. The apparatus of claim 34, further comprising:

means for recursively determining whether elements of said list of metrics for said unknown work match elements of said list of metrics for said known work.

38. An apparatus for identifying a work in a digital processing system, comprising:

means for selecting a portion of data of an unknown work;

means for detecting each event in said portion of data of said unknown work;

means for determining a metric between each successive event in said portion of data in said unknown work;

means for generating a list of metrics between said events for said unknown work;

means for comparing said list of metrics for said unknown work to a list of metrics for a known work, wherein the comparing comprises means for receiving said list of metrics of said unknown work and said list of metrics of said known work, means for determining a number of events in said list of metrics for said unknown work that match events in said list of metrics for said known work, wherein the means for determining the number of events comprises
 means for receiving said list of metrics for said unknown work starting at the Mth element,
 means for receiving said list of metrics of said known work starting at the Nth element,
 means for generating a list of associated pairs wherein each M+X element of said list of metrics for said unknown work is paired with the N+X element of said list of metrics for said known work,
 means for computing a regression line through said associated pair in said list of associated pairs,
 means for determining a miss ratio from said computation of said regression line,
 means for comparing said miss ratio to a miss ratio threshold, and
 means for determining a match between said lists responsive to said miss ratio being less than said miss ratio threshold,
 means for determining whether said number at least equals a threshold, and
 means for returning a match responsive to said number being at least equal to said threshold; and
means for determining said unknown work is a copy of said known work responsive to a match between said list of metrics of said unknown work and said list of metrics for said known work.

39. The apparatus of claim 38 further comprising:
means for comparing said list of metrics of said unknown work to a plurality of lists of metrics wherein each list of metrics is for a known work responsive to a determination that said list of metrics of said unknown work did not match said list of metrics of said known work; and
means for determining said unknown work is a copy of one of said known works responsive to a match of said list of metrics of said unknown work and said one of said plurality of lists that represents said one of said known works.

40. The apparatus of claim 38, wherein the means for determining said number comprises:
 means for aligning an Mth element of said list of metrics of said unknown work with an Nth element of said list of metrics for said known work;
 means for performing a first comparison of said lists starting from said Mth element in said list of metrics for said unknown list and said Nth element in said list of metrics for said known work;
 means for determining whether said lists from said Mth element and said Nth element match; and
 means for determining a match responsive to a determination said lists match.

41. The apparatus of claim 38 further comprising:
means for recursively determining whether elements of said list of metrics for said unknown work match elements of said list of metrics for said known work.

42. An apparatus for identifying a work in a digital processing system, comprising:
 means for selecting a portion of data of an unknown work;
 means for detecting each event in said portion of data of said unknown work;
 means for determining a metric between each successive event in said portion of data in said unknown work;
 means for generating a list of metrics between said events for said unknown work;
 means for comparing said list of metrics for said unknown work to a list of metrics for a known work, wherein the means for comparing comprises
  means for receiving said list of metrics of said unknown work and said list of metrics of said known work,
  means for determining a number of events in said list of metrics for said unknown work that match events in said list of metrics for said known work, wherein the means for determining the number of events comprises
   means for receiving said list of metrics for said unknown work starting at the Mth element,
   means for receiving said list of metrics of said known work starting at the Nth element,
   means for generating a list of associated pairs wherein each M+X element of said list of metrics for said unknown work is paired with the N+X element of said list of metrics for said known work,
   means for computing a regression line through said associated pair in said list of associated pairs,
   means for determining a weighted miss ratio from said computation of said regression line,
   means for comparing said weighted miss ratio to a weighted miss ratio threshold, and
   means for determining a match between said lists responsive to said weighted miss ratio being less than said weighted miss ratio threshold,
  means for determining whether said number at least equals a threshold, and
  means for returning a match responsive to said number being at least equal to said threshold; and
 means for determining said unknown work is a copy of said known work responsive to a match between said list of metrics of said unknown work and said list of metrics for said known work.

43. The apparatus of claim 42 further comprising:
means for comparing said list of metrics of said unknown work to a plurality of lists of metrics wherein each list of metrics is for a known work responsive to a determination that said list of metrics of said unknown work did not match said list of metrics of said known work; and
means for determining said unknown work is a copy of one of said known works responsive to a match of said list of metrics of said unknown work and said one of said plurality of lists that represents said one of said known works.

44. The apparatus of claim 42, wherein the means for determining said number comprises:
 means for aligning an Mth element of said list of metrics of said unknown work with an Nth element of said list of metrics for said known work;
 means for performing a first comparison of said lists starting from said Mth element in said list of metrics for said unknown list and said Nth element in said list of metrics for said known work;
 means for determining whether said lists from said Mth element and said Nth element match; and
 means for determining a match responsive to a determination said lists match.

45. The apparatus of claim 42, further comprising:
means for recursively determining whether elements of said list of metrics for said unknown work match elements of said list of metrics for said known work.

* * * * *